United States Patent
Iwatsuka et al.

(10) Patent No.: US 12,085,791 B2
(45) Date of Patent: Sep. 10, 2024

(54) OPTICAL WAVEGUIDE ELEMENT AND OPTICAL MODULATION ELEMENT

(71) Applicant: TDK Corporation, Tokyo (JP)

(72) Inventors: Shinji Iwatsuka, Tokyo (JP); Hiroki Hara, Tokyo (JP); Anthony Reymund Melad Binarao, Hong Kong (CN); Cheng Bu Heng, Hong Kong (CN); Hiroshi Take, Hong Kong (CN); Kenji Nagase, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 225 days.

(21) Appl. No.: 17/797,213

(22) PCT Filed: Jan. 20, 2021

(86) PCT No.: PCT/JP2021/001825
§ 371 (c)(1),
(2) Date: Aug. 3, 2022

(87) PCT Pub. No.: WO2021/161747
PCT Pub. Date: Aug. 19, 2021

(65) Prior Publication Data
US 2023/0069468 A1 Mar. 2, 2023

(30) Foreign Application Priority Data
Feb. 14, 2020 (JP) .................. 2020-023293

(51) Int. Cl.
*G02F 1/035* (2006.01)
(52) U.S. Cl.
CPC .......... *G02F 1/035* (2013.01); *G02F 2202/20* (2013.01)
(58) Field of Classification Search
CPC ..... G02F 1/035; G02F 2202/20; G02B 6/122; G02B 2006/12097
See application file for complete search history.

(56) References Cited

U.S. PATENT DOCUMENTS 11,366,344 B2 * 6/2022 Iwatsuka ............... G02F 1/011
11,598,980 B2 * 3/2023 Wang ................. G02F 1/0018
(Continued)

FOREIGN PATENT DOCUMENTS

JP     2005-215395 A     8/2005
JP     2005-221874 A     8/2005
(Continued)

OTHER PUBLICATIONS

International Search Report issued in corresponding International Patent Application No. PCT/JP2021/001825, dated Apr. 20, 2021, with English translation.

*Primary Examiner* — John Bedtelyon
(74) *Attorney, Agent, or Firm* — Rimon P.C.

(57) ABSTRACT

An optical waveguide element includes: an optical waveguide having a ridge part and a slab part having a thickness less than the ridge part. The optical waveguide includes: a first waveguide having a first ridge with and a first slab film thickness; a second waveguide having a second ridge width and a second slab film thickness; a first intermediate waveguide connected to the first waveguide and having a third ridge width and the first slab film thickness; and a second intermediate waveguide connected to the second waveguide and having a fourth ridge width and the second slab film thickness. The first waveguide, the first intermediate waveguide, the second intermediate waveguide, and the second waveguide are arranged in this order; the second slab film thickness is larger than the first slab film thickness; and the third ridge width is larger than the fourth ridge width.

12 Claims, 18 Drawing Sheets

(56) References Cited

U.S. PATENT DOCUMENTS

2005/0175271 A1 8/2005 Sugiyama et al.
2019/0271897 A1 9/2019 Iwatsuka et al.

FOREIGN PATENT DOCUMENTS

| JP | 2006-195383 A | 7/2006 |
| JP | 2017-129834 A | 7/2017 |

* cited by examiner

OPTICAL WAVEGUIDE ELEMENT AND OPTICAL MODULATION ELEMENT

CROSS REFERENCE TO RELATED APPLICATIONS

This application is the U.S. National Phase under 35 U.S.C. § 371 of International Application No. PCT/JP2021/001825, filed on Jan. 20, 2021, which claims the benefit of Japanese Patent Application No. 2020-023293, filed on Feb. 14, 2020, the entire contents of each are hereby incorporated by reference.

TECHNICAL FIELD

The present invention relates to an optical waveguide element and an optical modulation element, more particularly, to a waveguide structure of a Mach-Zehnder optical modulation element.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

The optical modulator is one of the typical electro-optical devices, and a Mach-Zehnder optical modulator in which an optical waveguide is formed by Ti (titanium) diffusion in the vicinity of the surface of a lithium niobate single-crystal substrate has been put to practical use (refer to, for example, a Patent Document 1). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, a Patent Document 2 disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

Patent Document 3 describes a ridge-shaped optical waveguide element having a waveguide layer formed of a lithium niobate film on a substrate, the waveguide layer including a slab part having a certain thickness and a ridge part protruding from the slab part. In this ridge-shaped optical waveguide element, the thickness of the slab part is less than 0.4 times the wavelength of light propagating through the ridge part, so that propagation loss can be reduced to a lower level even with a reduced ridge width.

Further, as to an optical waveguide structure, Patent Document 4 describes that in order to connect an input/output waveguide part constituted by a ridge-shaped optical waveguide and an optical switch main part constitute by a high-mesa type optical waveguide, an input/output tapered waveguide part is provided between the input/output waveguide part and optical switch main part to change stepwise the shape of the waveguide.

CITATION LIST

Patent Document

[Patent Document 1] Japanese Patent No. 4,485,218
[Patent Document 2] Japanese patent application Laid-open No. 2006-195383
[Patent Document 3] Japanese patent application Laid-open No. 2017-129834
[Patent Document 4] Japanese Patent No. 3,816,924

DISCLOSURE OF THE INVENTION

Problem to be Solved by the Invention

When a lithium niobate film epitaxially grown on a substrate is processed into a ridge shape to form an optical waveguide, light confinement effect can be enhanced by ensuring a sufficient height for a ridge part and reducing the film thickness of a slab part extending left and right from the ridge part. Thus, when voltage is applied between a pair of electrodes, a sufficient electric field can be applied to the optical waveguide, allowing a half-wavelength voltage $V\pi$ to be reduced. The half-wavelength voltage $V\pi$ is a difference $(V_1-V_2)$ between a voltage $V_1$ at which an optical output becomes maximum and a voltage $V_2$ at which the optical output becomes minimum, and a driving voltage is proportional to the half-wavelength voltage $V\pi$. Thus, a reduction in the half-wavelength voltage $V\pi$ means a reduction in driving voltage.

However, when a DC bias is applied to such an optical waveguide, the lifetime of an optical modulation element is shortened due to large DC drift. The DC drift refers to the temporal change of an operating point of optical output. Typically, the optical output operating point is adjusted by a DC bias to an average value between the maximum optical output and minimum optical output; however, when the slab film thickness is reduced so as to ensure the height of the ridge part, the temporal change of operating point becomes large, disadvantageously resulting in a reduction in time (lifetime) to reach a state where the operating point cannot be adjusted even with application of a large DC bias.

An object of the present invention is therefore to provide an optical waveguide element capable of achieving a reduction in DC drift while reducing propagation loss of light and an optical modulation element using such an optical waveguide element. Another object of the present invention is to provide an optical modulation element capable of achieving a reduction both in driving voltage and in DC drift.

Means for Solving the Problems

As a result of intensive studies as to a structure of an optical modulation element that can reduce DC drift, the present inventors have obtained the following findings: DC drift depends on the slab film thickness of the ridge waveguide, and a reduction in the slab film thickness allows a reduction in driving voltage of the optical modulation element, whereas it causes an increase in DC drift. Further, the present inventors have found that when two optical waveguides having different slab film thicknesses are connected to each other, although connection loss increases due to a discontinuous variation in the slab film thickness, it can be reduced by adjusting the ridge widths of the two optical waveguides.

The present invention has been made based on the above findings, and an optical waveguide element according to the present invention includes: a substrate; and an optical waveguide formed of a thin film on the substrate and having a ridge part which is a protruding portion and a slab part having a film thickness smaller than that of the ridge part. The optical waveguide includes: a first waveguide part having a first ridge width ($W_1$) and a first slab film thickness ($T_{sb1}$); a second waveguide part having a second ridge width ($W_2$) and a second slab film thickness ($T_{sb2}$); a first intermediate waveguide part connected to the first waveguide part and having a third ridge width ($W_{1c}$) and the first slab film thickness ($T_{sb1}$); and a second intermediate waveguide part connected to the second waveguide part and having a fourth ridge width ($W_{2c}$) and the second slab film thickness ($T_{sb2}$). The first waveguide part, first intermediate waveguide part, second intermediate waveguide part, and second waveguide part are arranged in this order. The second slab film thickness ($T_{sb2}$) is larger than the first slab film thickness ($T_{sb1}$) ($T_{sb2}>T_{sb1}$). The third ridge width ($W_{1c}$) is larger than the fourth ridge width ($W_{2c}$) ($W_{1c}>W_{2c}$).

According to the present invention, connection loss occurring due to connection between ridge waveguides having different slab film thicknesses can be reduced.

In the present invention, the third ridge width ($W_{1c}$) is preferably smaller than twice the fourth ridge width ($W_{2c}$) ($W_{1c}<2\times W_{2c}$). This can prevent an increase in connection loss due to excessively large third ridge width ($W_{1c}$) of the first intermediate waveguide part as compared to the fourth ridge width ($W_{2c}$) of the second intermediate waveguide part.

In the present invention, the third ridge width ($W_{1c}$) is preferably larger than the first ridge width ($W_1$) ($W_{1c}>W_1$), and the fourth ridge width ($W_{2c}$) is preferably larger than the second ridge width ($W_2$) ($W_{2c}>W_2$). This configuration is resistant to axis misalignment and can thus enhance the connection loss reduction effect.

In the present invention, the second ridge width ($W_2$) is preferably larger than the first ridge width ($W_1$) ($W_2>W_1$). With this configuration, when the first and second waveguide parts are configured as an RF part and a DC part, respectively, it is possible to enhance DC drift reduction effect in the DC part while reducing driving voltage in the RF part.

In the preset invention, the optical waveguide preferably further includes a third intermediate waveguide part provided between the first and second intermediate waveguide parts and having a cross-sectional shape different from those of the first and second intermediate waveguide parts. In this case, the third intermediate waveguide part may have a third slab film thickness ($T_{sb3}$) smaller than the first slab film thickness ($T_{sb1}$), may have no slab part, and may have no waveguide shape. In either structure, it is possible to reduce connection loss occurring due to connection between the ridge waveguides having different slab film thicknesses.

In the present invention, a length ($L_C$) of the third intermediate waveguide part is preferably 3 μm or less ($L_C \leq 3$ μm). When the length of the third intermediate waveguide part is 3 μm or less, a waveguide structure small in connection loss can be achieved irrespective of the cross-sectional shape of the third intermediate waveguide part.

In the present invention, the first slab film thickness ($T_{sb1}$) is preferably less than 0.6 μm (0 μm $\leq T_{sb1}<0.6$ μm), and the second slab film thickness ($T_{sb2}$) is preferably 0.6 μm or more ($T_{sb2} \geq 0.6$ μm). With this configuration, it is possible to achieve a reduction in DC drift in the DC part while reducing driving voltage in the RF part.

In the present invention, the thin film is preferably a lithium niobate film, and the c-axis of the lithium niobate film is preferably oriented perpendicular to the main surface of the substrate. With the ridge waveguide formed of such a lithium niobate film, propagation loss can be reduced to a lower level even with a reduced ridge width.

An optical modulation element according to the present invention includes: an optical waveguide element having the above features; a signal electrode that applies an RF signal to the first waveguide part; and a bias electrode that applies a DC bias to the second waveguide part. The thin film is made of an electrooptic material. According to the present invention, there can be provided an optical modulation element capable of reducing connection loss occurring due to connection between the ridge waveguides having different slab film thicknesses.

Advantageous Effects of the Invention

According to the present invention, there can be provided an optical waveguide element and an optical modulation element which are capable of achieving a reduction in DC drift while reducing propagation loss of light. Further, according to the present invention, there can be provided an optical modulation element capable of achieving a reduction both in driving voltage and in DC drift.

BRIEF DESCRIPTION OF THE DRAWINGS

FIGS. 1A and 1B are schematic plan views illustrating an optical modulation element according to a first embodiment of the present invention, in which FIG. 1A illustrates only an optical waveguide, and FIG. 1B illustrates the entire configuration of the optical modulating element including a traveling-wave electrode.

FIGS. 2A and 2B are schematic cross-sectional views of the optical modulation element, in which FIG. 2A is a cross-sectional view of the RF part taken along the line X1-X1' in FIGS. 1A and 1B, and FIG. 2B is a cross-sectional view of the DC part 3b taken along the line X2-X2' in FIGS. 1A and 1B.

FIGS. 12A and 12B are schematic cross-sectional views of an optical modulation element according to a fourth embodiment of the present invention, in which FIG. 12A is a cross-sectional view of the RF part, and FIG. 12B is a cross-sectional view of the DC part.

MODE FOR CARRYING OUT THE INVENTION

Preferred embodiments of the present invention will be described below with reference to the accompanying drawings.

Figure 1A:
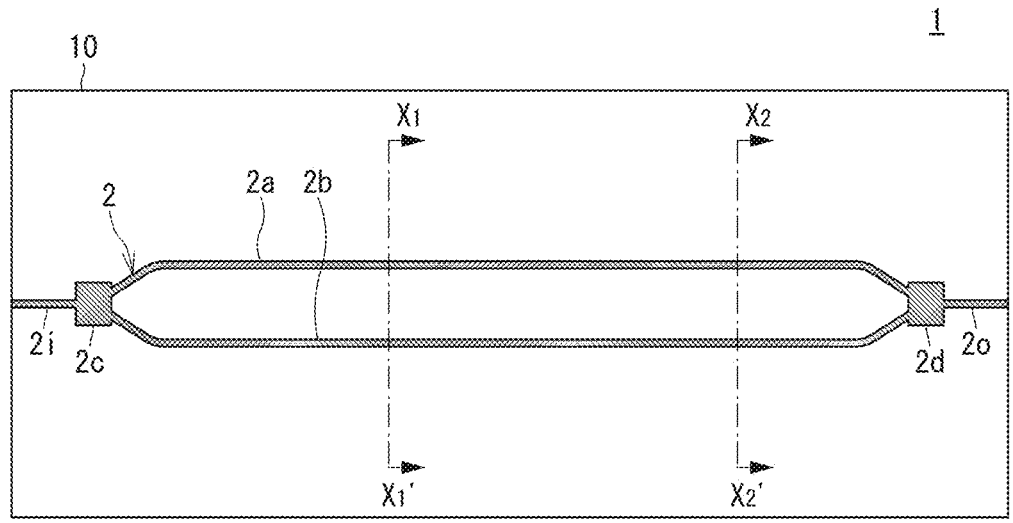
Figure 1B:
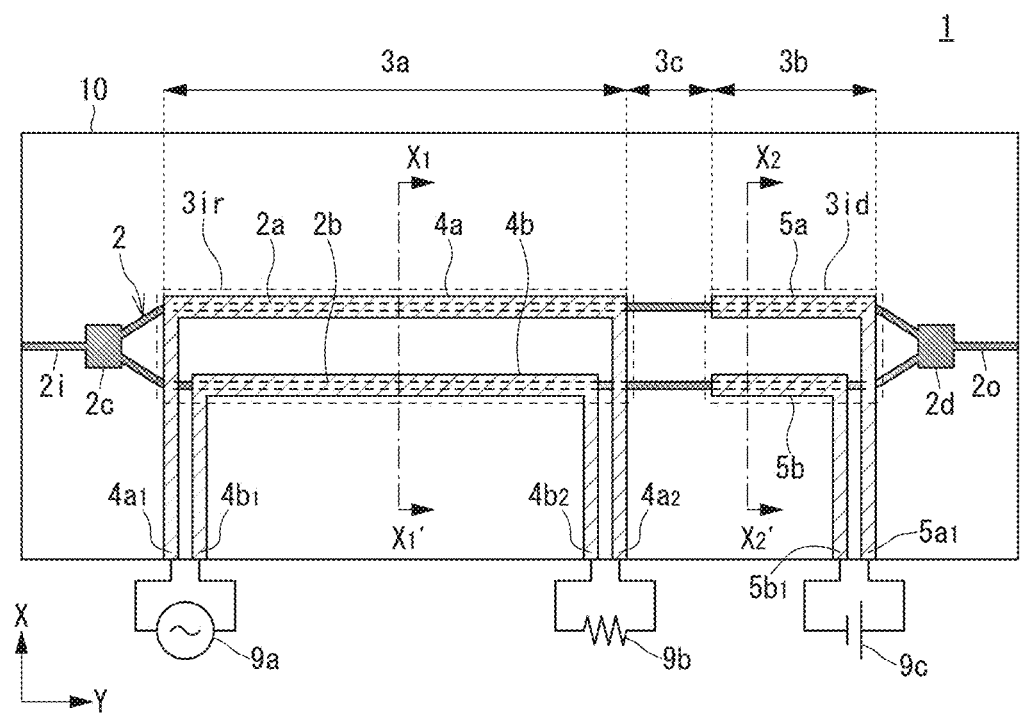

FIGS. 1A and 1B are schematic plan views illustrating an optical modulation element according to a first embodiment of the present invention. FIG. 1A illustrates only an optical waveguide, and FIG. 1B illustrates the entire configuration of the optical modulating element including a traveling-wave electrode.

As illustrated in FIGS. 1A and 1B, an optical modulation element 1 includes a Mach-Zehnder optical waveguide 2 formed on a substrate 10 and having first and second optical waveguides 2a and 2b provided in parallel to each other, a first signal electrode 4a provided along the first waveguide 2a, a second signal electrode 4b provided along the second waveguide 2b, a first bias electrode 5a provided along the first waveguide 2a, and a second bias electrode 5b provided along the second waveguide 2b. The first and second signal electrodes 4a and 4b constitute an RF interaction part 3ir of the Mach-Zehnder optical modulation element together with the first and second waveguides 2a and 2b. The first and second bias electrodes 5a and 5b constitute a DC interaction part 3id of the Mach-Zehnder optical modulation element together with the first and second waveguides 2a and 2b.

The Mach-Zehnder optical waveguide 2 is an optical waveguide element having a Mach-Zehnder interferometer structure. The Mach-Zehnder optical waveguide 2 has an input waveguide 2i, a demultiplexer 2c demultiplexing light propagating through the input waveguide 2i, first and second waveguides 2a and 2b extending in parallel from the demultiplexer 2c, a multiplexer 2d multiplexing lights propagating through the first and second waveguides 2a and 2b, and an output waveguide 2o through which light output from the multiplexer 2d propagates. Light input to the input waveguide 2i is demultiplexed at the demultiplexer 2c. The demultiplexed lights travel through the first and second waveguides 2a and 2b, respectively, and multiplexed at the multiplexer 2d. The multiplexed light is then output from the output waveguide 2o as a modulated light.

The first and second signal electrodes 4a and 4b are linear electrode patterns overlapping the first and second waveguides 2a and 2b, respectively, in a plan view. Both ends of each of the first and second signal electrodes 4a and 4b are drawn to the vicinity of the outer peripheral end of the substrate 10. More specifically, one ends $4a_1$ and $4b_1$ of the first and second signal electrodes 4a and 4b are each drawn to the vicinity of the edge of the substrate 10 to constitute a signal input port, and a driver circuit 9a is connected to the signal input ports. The other ends $4a_2$ and $4b_2$ of the first and second signal electrodes 4a and 4b are drawn to the vicinity of the edge of the substrate 10 and connected to each other through a terminal resistor 9b. As a result, the first and second signal electrodes 4a and 4b function as a differential coplanar traveling-wave electrode.

The first and second bias electrodes 5a and 5b are provided independently of the first and second signal electrodes 4a and 4b, respectively, so as to apply a DC bias to the first and second waveguides 2a and 2b. One ends $5a_1$ and $5b_1$ of the first and second bias electrodes 5a and 5b are each drawn to the vicinity of the substrate to constitute a DC bias input port, and a bias circuit 9c is connected to the DC bias input ports. Although, in the present embodiment, the first and second bias electrodes 5a and 5b are positioned closer to the output terminal side of the Mach-Zehnder optical waveguide 2 than the first and second signal electrodes 4a and 4b, they may be positioned closer to the input terminal side.

Thus, the first and second signal electrodes 4a and 4b constitute an RF part 3a that applies an RF signal to the first and second waveguides 2a and 2b, and first and second bias electrodes 5a and 5b constitute a DC part 3b that applies a DC bias to the first and second waveguides 2a and 2b. An intermediate part 3c between the RF part 3a and DC part 3b has neither the signal electrode nor the bias electrode. Although details will be described later, the optical waveguide in the intermediate part 3c has a particular shape so as to connect the optical waveguide in the RF part 3a and that in the DC part 3b.

Differential signals (modulated signals) having the same absolute value but opposite polarities are input to the one ends of the first and second signal electrodes 4a and 4b. The first and second waveguides 2a and 2b are each formed of a material, such as lithium niobate, having electrooptic effect, so that the refractive indices of the first and second waveguides 2a and 2b are changed with +Δn and −Δn by an electric field applied to the first and second waveguides 2a and 2b, with the result that a phase difference between the pair of optical waveguides is changed. A signal light modulated by the change in the phase difference is output from the output waveguide 2o.

As described above, the optical modulation element 1 according to the present embodiment is of a dual drive type constituted by the pair of signal electrodes, so that it is possible to increase the symmetry of an electric field to be applied to the pair of optical waveguides to thereby reduce a wavelength chirp.

Figure 2A:
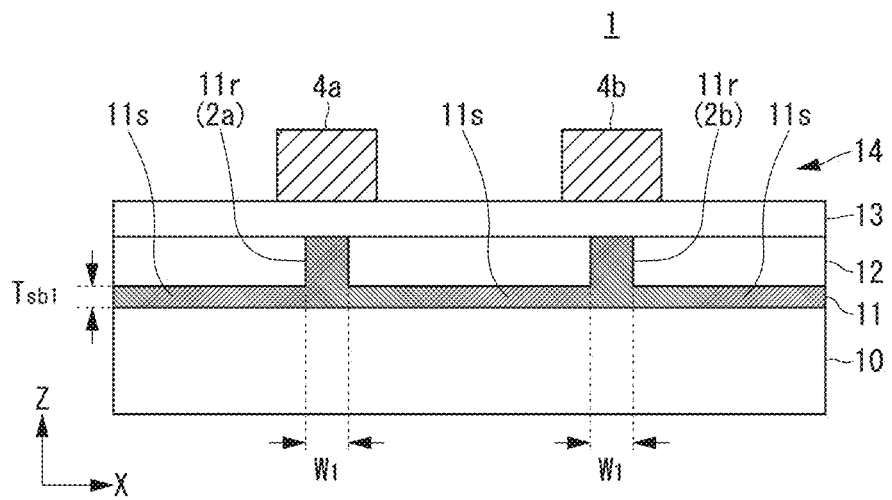
Figure 2B:
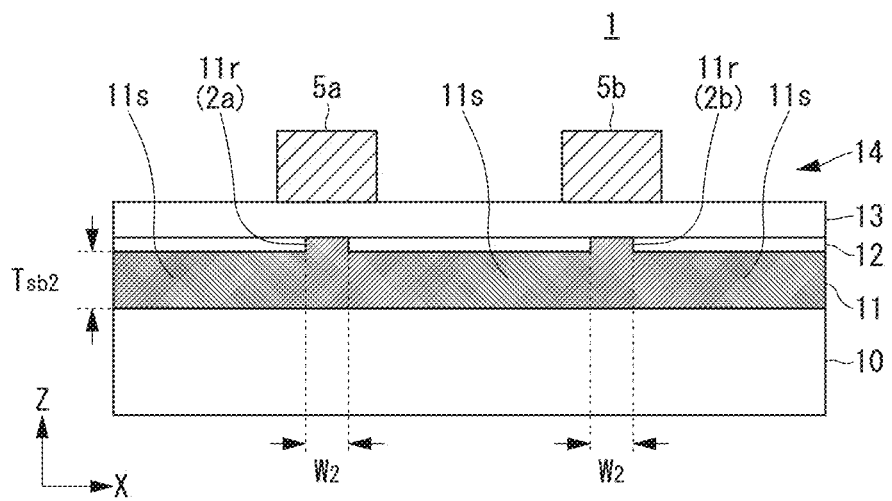

FIGS. 2A and 2B are schematic cross-sectional views of the optical modulation element 1, in which FIG. 2A is a cross-sectional view of the RF part 3a taken along the line $X_1$-$X_1'$ in FIGS. 1A and 1B, and FIG. 2B is a cross-sectional view of the DC part 3b taken along the line $X_2$-$X_2'$ in FIGS. 1A and 1B.

As illustrated in FIGS. 2A and 2B, the optical modulation element 1 has a multilayer structure including a substrate 10, a waveguide layer 11, a protective layer 12, a buffer layer 13, and an electrode layer 14, which are laminated in this order.

The substrate 10 is, e.g., a sapphire substrate, and the waveguide layer 11 of an electrooptic material, such as lithium niobate, is formed on the main surface of the substrate 10. The waveguide layer 11 has ridge parts 11r, i.e., protruding portions, and a slab part 11s provided on both sides of each of the ridge part 11r and each having a reduced thickness, and the ridge parts 11r constitute the first and second waveguides 2a and 2b, respectively. A width $W_1$ (first ridge width) of the ridge part 11r in the RF part 3a and a width $W_2$ (second ridge width) of the ridge part 11r in the DC part 3b can be set to 0.5 µm to 5 µm. Although the width $W_1$ of the ridge part 11r in the RF part 3a and width $W_2$ of the ridge part 11r in the DC part 3b are equal to each other in the present embodiment, they may differ from each other.

The ridge part 11r is a main part of the optical waveguide. As described above, the ridge part 11r refers to an upwardly protruding portion. The protruding portion has a larger film thickness of the electrooptic material film than that of left and right portions thereof and thus has a high effective refractive index. This allows light to be confined also in the left-right direction, so that a function as a three-dimensional optical waveguide is achieved. The ridge part 11r may be any shape as long as it can guide light and has a larger film thickness of the electrooptic material film than that of left and right portions thereof. Therefore, the ridge part 11r may have an upwardly protruding dome shape or an upwardly protruding triangular shape. In forming the ridge part 11r, a mask such as a resist is formed on the electrooptic material, and the electrooptic material is selectively etched for patterning. The width, height, shape, and the like of the ridge part 11r need to be optimized so as to improve device characteristics.

The thickness of the ridge part 11r is typically equal to the thickness of the electrooptic material film. The width (ridge widths $W_1$, $W_2$) of the ridge part 11r is defined as the width of the upper surface of the ridge part 11r. This is because the side surface of the ridge part 11r may be inclined, although it is vertical to the substrate 10 in the illustrated example. The inclination angle of the side surface of the ridge part 11r is preferably close to 90° and may be at least 70°. When the width of the upper surface of the ridge part is set as the ridge width, the ridge width can clearly be defined even when the ridge part 11r has a trapezoidal shape.

The slab part 11s provided on both sides of each of the ridge part 11r is a part extending left and right from the ridge part 11r and formed of an electrooptic material film having a thickness smaller than the electrooptic material film of the ridge part 11r. In the present embodiment, the slab part 11s has a substantially constant thickness; however, the slab part 11s in the vicinity of the root of the ridge part 11r may include a gentle tapered shape or a depression, so that the slab film thickness is unstable. Thus, the thickness of the slab part 11s is defined not as the thickness of a part where the film thickness transiently varies but as the thickness of a part slightly apart from the root of the ridge part 11r where the film thickness is stable.

A thickness $T_{sb1}$ (first slab film thickness) of the slab part 11s in the RF part 3a and a thickness $T_{sb2}$ (second slab film thickness) of the slab part 11s in the DC part 3b differ from each other. In the present embodiment, the thickness $T_{sb2}$ of the slab part 11s in the DC part 3b is preferably larger than the thickness $T_{sb1}$ of the slab part 11s in the RF part 3a. By thus increasing the thickness of the slab film thickness of the ridge wave guide in the DC part 3b, DC drift can be reduced to prolong the lifetime of the optical modulation element. Further, by reducing the slab film thickness of the ridge waveguide in the RF part 3a to increase the protruding height of the ridge part 11r, light confinement effect can be enhanced to improve light modulation efficiency.

The protective layer 12 is formed in an area not overlapping the first and second waveguides 2a and 2b in a plan view. The protective layer 12 covers the entire area of the upper surface of the waveguide layer 11 excluding portions where the ridge parts 11r are formed, and the side surfaces of each of the ridge parts 11r are also covered with the protective layer 12, so that scattering loss caused due to the roughness of the side surfaces of the ridge part 11r can be prevented. The thickness of the protective layer 12 is substantially equal to the height of the ridge part 11r of the waveguide layer 11. There is no particular restriction on the material of the protective layer 12 and, for example, silicon oxide ($SiO_2$) may be used.

The buffer layer 13 is formed on at least the upper surfaces of the ridge parts 11r so as to prevent light propagating through the first and second waveguides 2a and 2b from being absorbed by the first and second signal electrodes 4a and 4b. The buffer layer 13 is preferably formed of a material having a lower refractive index than those of the waveguide layer 11 and a high transparency, such as $Al_2O_3$, $SiO_2$, $LaAlO_3$, $LaYO_3$, Zno, $HfO_2$, MgO, or $Y_2O_3$. The thickness of the buffer layer 13 on the upper surface of the ridge part 11r may be about 0.2 µm to 1 µm. The buffer layer 13 is more preferably formed of a material having a high dielectric constant. In the present embodiment, although the buffer layer 13 covers not only the upper surfaces of the respective first and second waveguides 2a and 2b, but also the entire underlying surface including the upper surface of the protective layer 12, it may be patterned so as to selectively cover only the vicinity of the upper surfaces of the first and second waveguides 2a and 2b. Further, the buffer layer 13 may be directly formed over the entire upper surface of the waveguide layer 11 with the protective layer 12 omitted.

The film thickness of the buffer layer 13 is preferably as large as possible in order to reduce light absorption by an electrode and preferably as small as possible in order to apply a high electric field to the optical waveguide. The light absorption and applied voltage of an electrode have a trade-off relation, so that it is necessary to set adequate film thickness according to the purpose. The dielectric constant of the buffer layer 13 is preferably as high as possible, because the higher the dielectric constant thereof, the more VπL (index representing electric field efficiency) is reduced. Further, the refractive index of the buffer layer 13 is preferably as low as possible, because the lower the refractive index thereof, the thinner the buffer layer 13 can be. In general, a material having a high dielectric constant has a higher refractive index, so that it is important to select a material having a high dielectric constant and a relatively lower refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The buffer layer 13 in the RF part 3a illustrated in FIG. 2A and buffer layer 13 in the DC part 3b illustrated in FIG. 2B may be constituted by different materials. A buffer layer material that can optimize the characteristics of the RF part 3a is used for the buffer layer 13 in the RF part 3a, and a buffer layer material that can reduce DC drift is used for the buffer layer 13 in the DC part 3b, whereby the characteristics of the buffer layers 13 both in the RF part 3a and DC part 3b can be optimized. For example, as the material that can reduce DC drift, a material containing silicon oxide and indium oxide may be used.

As illustrated in FIG. 2A, the electrode layer 14 in the RF part 3a is provided with the first and second signal electrodes 4a and 4b. The first signal electrode 4a is provided overlapping the ridge part 11r corresponding to the first waveguide 2a so as to modulate light traveling inside the first waveguide 2a and is opposed to the first waveguide 2a through the buffer layer 13. The second signal electrode 4b is provided overlapping the ridge part 11r corresponding to the second waveguide 2b so as to modulate light traveling inside the second waveguide 2b and is opposed to the second waveguide 2b through the buffer layer 13.

As illustrated in FIG. 2B, the electrode layer 14 in the DC part 3b is provided with the first and second bias electrodes 5a and 5b. The first bias electrode 5a is provided overlapping the ridge part 11r corresponding to the first waveguide 2a so as to provide electric field biasing of light traveling inside the first waveguide 2a and is opposed to the first waveguide 2a through the buffer layer 13. The second bias electrode 5b is provided overlapping the ridge part 11r corresponding to the second waveguide 2b so as to provide electric field biasing of light traveling inside the second waveguide 2b and is opposed to the second waveguide 2b through the buffer layer 13.

As illustrated in FIGS. 2A and 2B, in the cross section perpendicular to the extending direction of first and second waveguides 2a and 2b, an electrode structure is left-right symmetric. Thus, the magnitudes of electric fields applied from the first and second signal electrodes 4a and 4b to the respective first and second waveguides 2a and 2b are made the same as much as possible, whereby the wavelength chirp can be reduced.

In the present invention, the electrode structure is not particularly limited and may be of a so-called a single-drive type, and the presence/absence of a ground electrode and the layout thereof are not particularly limited.

The waveguide layer 11 is not particularly limited as long as it is made of an electrooptic material and is preferably made of lithium niobate ($LiNbO_3$). This is because lithium niobate has a large electrooptic constant and is thus suitable as the constituent material of an optical device such as an optical modulation element. An explanation will now be given of the configuration of the present embodiment, where the waveguide layer 11 is a lithium niobate film.

Although the substrate 10 is not particularly limited as long as it has a lower refractive index than that of a lithium niobate film, the substrate 10 is preferably a substrate on which the lithium niobate film can be formed as an epitaxial film. Specifically, the substrate 10 is preferably a sapphire single crystal substrate or a silicon single crystal substrate. The crystal orientation of the single crystal substrate is not particularly limited. The lithium niobate film can be easily formed as a c-axis oriented epitaxial film on single crystal substrates having different crystal orientations. Since the c-axis oriented lithium niobate film has three-fold symmetry, the underlying single crystal substrate preferably has the same symmetry. Thus, when the sapphire single crystal substrate is used as the substrate 10, it preferably has a c-plane, and when the silicon single crystal substrate is used as the substrate 10, it preferably has a (111) surface.

The epitaxial film refers to a film having the crystal orientation of the underlying substrate or film. When the film in-plane surface is defined as an X-Y plane, and the film thickness direction is as a Z-axis, the crystal is uniformly oriented along the X-, Y-, and Z-axes. For example, an epitaxial film can be confirmed by first measuring the peak intensity at the orientation position by $2\theta\text{-}\theta$ X-ray diffraction and secondly observing poles.

Specifically, first, in the $2\theta\text{-}\theta$ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002), and other equivalent surfaces.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single crystal $LiNbO_3$ (014) has three poles.

For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single crystal silicon substrate having a (100) surface, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_Ay_Oz$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of 2 μm or less. This is because a high-quality lithium niobate film having a thickness more than 2 μm is difficult to form. The lithium niobate film having an excessively small thickness cannot completely confine light in it, disadvantageously allowing the light to penetrate through the substrate 10 and/or the buffer layer 13. Application of an electric field to the lithium niobate film may therefore cause a change in the effective refractive index of the optical waveguide (2a, 2b) to decrease. Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 10 can change the optical refractive index in proportion to the electric field. In the case of the single crystal substrate made of sapphire, the lithium niobate film can be directly epitaxially grown on the sapphire single crystal substrate. In the case of the single crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

As illustrated in FIG. 2A, the width of the first and second signal electrodes 4a and 4b is slightly larger than the ridge width $W_1$ of the first and second waveguides 2a and 2b of a ridge-shaped lithium niobate film. To concentrate an electric field from the first and second signal electrodes 4a and 4b on the first and second waveguides 2a and 2b, the width of the first and second signal electrodes 4a and 4b is preferably 1.1 times to 15 times, more preferably, 1.5 times to 10 times the ridge width $W_1$ of the first and second waveguides 2a and 2b.

As illustrated in FIG. 2B, the width of the first and second bias electrodes 5a and 5b is slightly larger than the ridge width $W_2$ of the first and second waveguides 2a and 2b of a ridge-shaped lithium niobate film. To concentrate an electric field from the first and second bias electrodes 5a and 5b on the first and second waveguides 2a and 2b, the width of the first and second bias electrodes 5a and 5b is preferably 1.1 times to 15 times, more preferably, 1.5 times to 10 times the ridge width $W_2$ of the first and second waveguides 2a and 2b.

The slab part 11s of the first and second waveguides 2a and 2b in the DC part 3b illustrated in FIG. 2B is thicker than the slab part 11s of the first and second waveguides 2a and 2b in the RF part 3a illustrated in FIG. 2A. By thus increasing the slab film thickness $T_{sb2}$ of the ridge waveguide in the DC part 3b, DC drift can be reduced. Further, by reducing the slab film thickness $T_{sb1}$ of the ridge waveguide in the RF part 3a, effect of confining light propagating through the optical waveguide can be enhanced to improve light modulation efficiency, achieving a reduction in driving voltage as much as possible.

Although the reason that an increase in the slab film thickness in the DC part 3b reduces DC drift is unclear, it is thought that damage occurring at a time of processing the lithium niobate film into a ridge shape has influence on DC drift. To reduce the slab film thickness (to increase the protruding height of the ridge part), it is necessary to more deeply dig the upper surface of the lithium niobate film, and thus a surface to be processed is significantly damaged. On the other hand, when the slab film thickness is increased (the protruding height of the ridge part is reduced), the amount of processing applied to the lithium niobate film is small, so that a surface to be processed is less damaged. For the above reason, it is considered that DC drift is reduced to prolong the lifetime of the DC part 3b.

When the protruding height of the ridge part 11r constituting the first and second waveguides 2a and 2b in both the RF part 3a and DC part 3b is relatively increased to reduce the thicknesses $T_{sb1}$ and $T_{sb2}$ (slab film thickness) of the slab part 11s formed on both sides of the ridge part 11r, effect of confining light propagating through the optical waveguide can be increased to achieve a reduction in driving voltage as much as possible. However, when such a waveguide structure is applied to the DC part, DC drift increases to fail to prolong the lifetime of the optical modulation element. On the other hand, when the protruding height of the ridge part 11r in both the RF part 3a and DC part 3b is relatively reduced to increase the thicknesses $T_{sb1}$ and $T_{sb2}$ (slab film thickness) of the slab part 11s, DC drift can be reduced, whereas the half-wavelength voltage Vπ increases to fail a reduction in driving voltage.

However, in the present embodiment, the slab film thickness of the optical waveguide in the DC part 3b is made different from that in the RF part 3a such that the slab film thickness in the DC part 3b is relatively increased and that the slab film thickness in the RF part 3a is relatively reduced, whereby both the DC drift reduction effect in the DC part 3b and reduction in driving voltage in the RF part 3a can be achieved.

When the slab film thickness $T_{sb1}$ of the first and second waveguides 2a and 2b in the RF part 3a and the slab film thickness $T_{sb2}$ of the first and second waveguides 2a and 2b in the DC part 3b are different, simply connecting the waveguides in the RF part 3a and DC part 3b disadvantageously increases connection loss due to mismatch of the waveguide shape. Thus, in the present embodiment, an intermediate waveguide part is provided in the intermediate part 3c between the RF part 3a and DC part 3b so as to enhance a level of matching between the waveguides in the RF part 3a and DC part 3b. Hereinafter, the configuration of the intermediate waveguide part will be described in detail.

Figure 3:
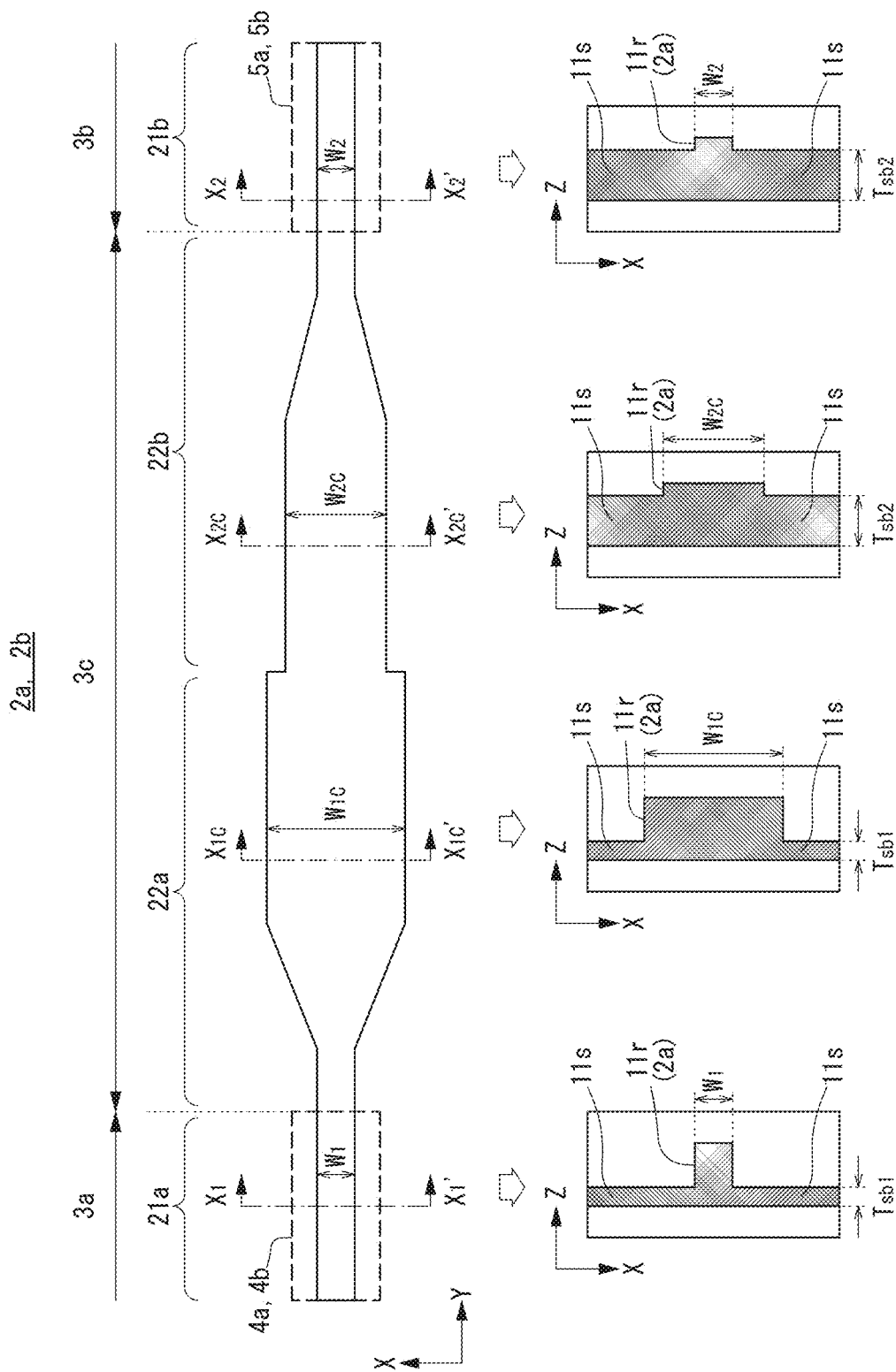
FIG. 3 includes a schematic plan view and schematic cross-sectional views illustrating a waveguide structure around the intermediate part between the RF part and DC part.
Figure 4:
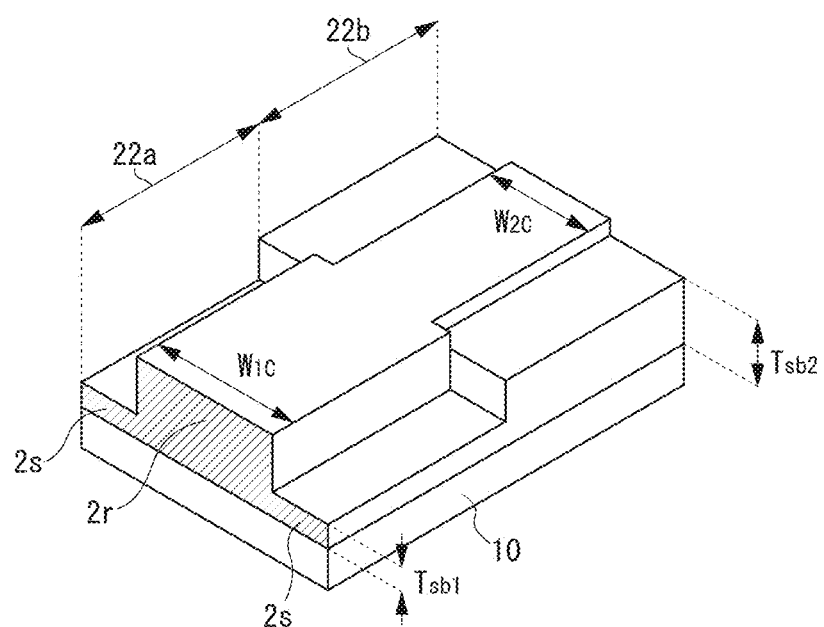
FIG. 4 is a schematic perspective view three-dimensionally illustrating the waveguide structure in the intermediate part.

FIG. 3 includes a schematic plan view and schematic cross-sectional views illustrating a waveguide structure around the intermediate part 3c between the RF part 3a and DC part 3b. FIG. 4 is a schematic perspective view three-dimensionally illustrating the waveguide structure in the intermediate part 3c.

As illustrated in FIGS. 3 and 4, the first and second waveguides 2a and 2b each includes a first waveguide part 21a which is an optical waveguide in the RF part 3a, a second waveguide part 21b which is an optical waveguide in the DC part 3b, a first intermediate waveguide part 22a provided in the intermediate part 3c on the side close to the RF part 3a so as to be connected to the first waveguide part 21a, and a second intermediate waveguide part 22b provided in the intermediate part 3c on the side close to the DC part 3b so as to be connected to the second waveguide part 21b. That is, the first and second waveguides 2a and 2b each have a configuration in which the first waveguide part 21a, first intermediate waveguide part 22a, second intermediate waveguide part 22b, and second waveguide part 21b are arranged in this order.

The first waveguide part 21a has the ridge width $W_1$ and slab film thickness $T_{sb1}$, and second waveguide part 21b has the ridge width $W_2$ (=$W_1$) and slab film thickness $T_{sb2}$ (>$T_{sb1}$). When the first and second waveguide parts 21a and 21b having different slab film thicknesses and a small ridge width are directly connected to each other, light propagation loss becomes large due to mismatch in the boundary therebetween. Thus, in the present embodiment, the first intermediate waveguide part 22a and second intermediate waveguide part 22b are provided between the first waveguide part 21a in the RF part 3a and second waveguide part 21b in the DC part 3b so as to reduce the light propagation loss.

The first intermediate waveguide part 22a is a ridge waveguide connected to the first waveguide part 21a. The first intermediate waveguide part 22a has the same slab film thickness ($T_{sb1}$) as that of the first waveguide part 21a and has a ridge width $W_{1c}$ (third ridge width) larger than the ridge width of the first waveguide part 21a. The first intermediate waveguide part 22a is provided for enlarging the ridge width of the first waveguide part 21a and has a ridge width enlarged part whose width gradually increases toward the second waveguide part 21b. Thus, the width $W_{1c}$ (>$W_1$) of the first intermediate waveguide part 22a is larger than the width of the first waveguide part 21a at the connection position with the second intermediate waveguide part 22b.

The second intermediate waveguide part 22b is a ridge waveguide connected to the second waveguide part 21b. The second intermediate waveguide part 22b has the same slab film thickness ($T_{sb2}$) as that of the second waveguide part 21b and has a ridge width $W_{2c}$ (fourth ridge width) larger than the ridge width of the second waveguide part 21b. The second intermediate waveguide part 22b is provided for enlarging the ridge width of the second waveguide part 21b and has a ridge width enlarged part whose width gradually increases toward the first waveguide part 21a. Thus, the width $W_{2c}$ (>$W_2$) of the second intermediate waveguide part 22b is larger than the width of the second waveguide part 21b at the connection position with the first intermediate waveguide part 22a.

The ridge width $W_{1c}$ of the first intermediate waveguide part 22a is larger than the ridge width $W_{2c}$ of the second intermediate waveguide part 22b. Thus, the ridge width and slab film thickness of the optical waveguide discontinuously vary at the boundary between the first intermediate waveguide part 22a and second intermediate waveguide part 22b. When the first waveguide part 21a in the RF part 3a and second waveguide part 21b in the DC part 3b which are different in the slab film thickness are connected to each other, connection loss increases at the boundary therebetween due to a difference in the spot size of light propagating through the optical waveguide. However, when the ridge width $W_{1c}$ of the optical waveguide on the side close to the RF part 3a having a relatively smaller slab film thickness is enlarged, and the ridge width $W_{2c}$ of the optical waveguide on the side close to the DC part 3b having a relatively larger slab film thickness is reduced, it is possible to equalize the light spot size at the boundary between the first waveguide part 21a and second waveguide part 21b to thereby reduce connection loss.

The ridge width $W_{1c}$ of the first intermediate waveguide part 22a is preferably larger than the ridge width $W_{2c}$ Of the second intermediate waveguide part 22b and smaller than twice the ridge width $W_{2c}$ of the second intermediate waveguide part 22b ($W_{2c}$<$W_{1c}$<2×$W_{2c}$). This can prevent an increase in connection loss due to excessively large ridge width $W_{1c}$ of the first intermediate waveguide part 22a.

Typically, an optical waveguide having a varying ridge width is easily formed, and a single pattering process allows formation of a taper-shaped optical waveguide having a continuously varying ridge width, so that it is originally unnecessary to form the optical waveguide having a discontinuously varying ridge width. However, formation of the optical waveguide having different slab film thicknesses involves two patterning processes, and it is not easy to align two optical waveguides accurately. Thus, in the present embodiment, the optical waveguides having different slab film thicknesses and provided on the RF part 3a side and DC part 3b side, respectively, are processed separately and connected to each other with the ridge widths thereof in the vicinity of a connection part therebetween enlarged. This can reduce connection loss. Thus, the ridge waveguide having discontinuous ridge width and slab film thickness can be obtained.

Figure 5:
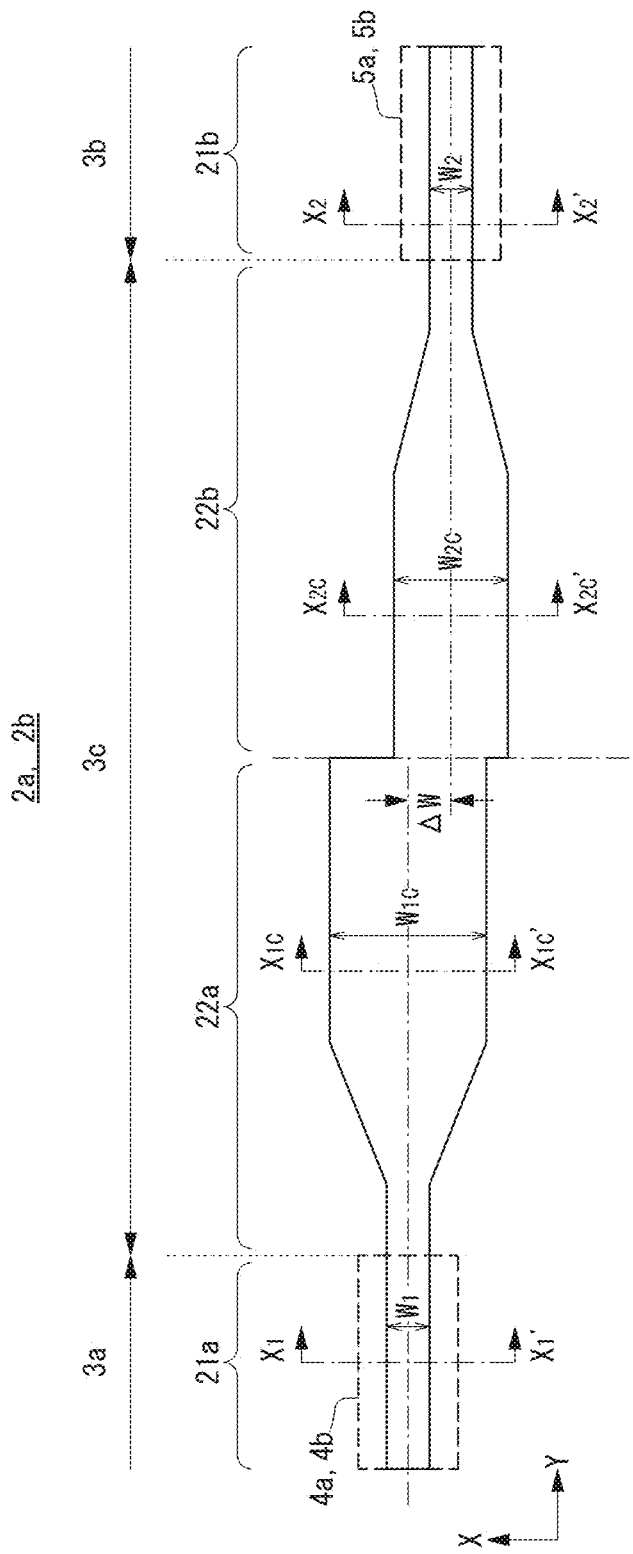
FIG. 5 is a schematic plan view illustrating a case where an axis misalignment occurs between the optical waveguide on the RF part side and optical waveguide on the DC part side.

FIG. 5 is a schematic plan view illustrating a case where an axis misalignment occurs between the optical waveguide on the RF part 3a side and optical waveguide on the DC part 3b side.

The waveguide pattern (first waveguide part 21a and first intermediate waveguide part 22a) on the RF part 3a side and waveguide pattern (second waveguide part 21b and second intermediate waveguide part 22b) on the DC part 3b side are processed separately so as to make the slab film thicknesses of the ridge waveguides different therebetween. In this case, as illustrated in FIG. 5, a misalignment (axis misalignment) of the waveguide pattern may occur. However, in the present embodiment, the ridge widths of the first and second intermediate waveguide parts 22a and 22b are enlarged, so that it is possible to prevent a reduction in the sectional area of the waveguide due to the axis misalignment to thereby reduce propagation loss of light due to a processing variation of the waveguide pattern.

As described above, in the optical modulation element 1 according to the present embodiment, the slab film thickness $T_{sb2}$ of the optical waveguide in the DC part 3b is larger than the slab film thickness $T_{sb1}$ of the optical waveguide in the RF part 3a, so that it is possible to reduce DC drift while achieving a reduction in driving voltage in the RF part 3a.

Further, in the optical modulation element 1 according to the present embodiment, in order to connect the optical waveguide (first waveguide part 21a) in the RF part 3a and optical waveguide (second waveguide part 21b) in the DC part 3b having different slab film thicknesses, the first and second intermediate waveguide parts 22a and 22b each having a varying ridge width are provided in the intermediate part 3c between the RF part 3a and DC part 3b, and the ridge width $W_{1c}$ of the first intermediate waveguide part 22a on the RF part 3a side is made larger than the ridge width $W_{2c}$ of the second intermediate waveguide part 22b on the DC part 3b side, so that it is possible to equalize the spot size of light propagating through the first waveguide part 21a and spot size of light propagating through the second waveguide part 21b to thereby reduce propagation loss.

Figure 6:
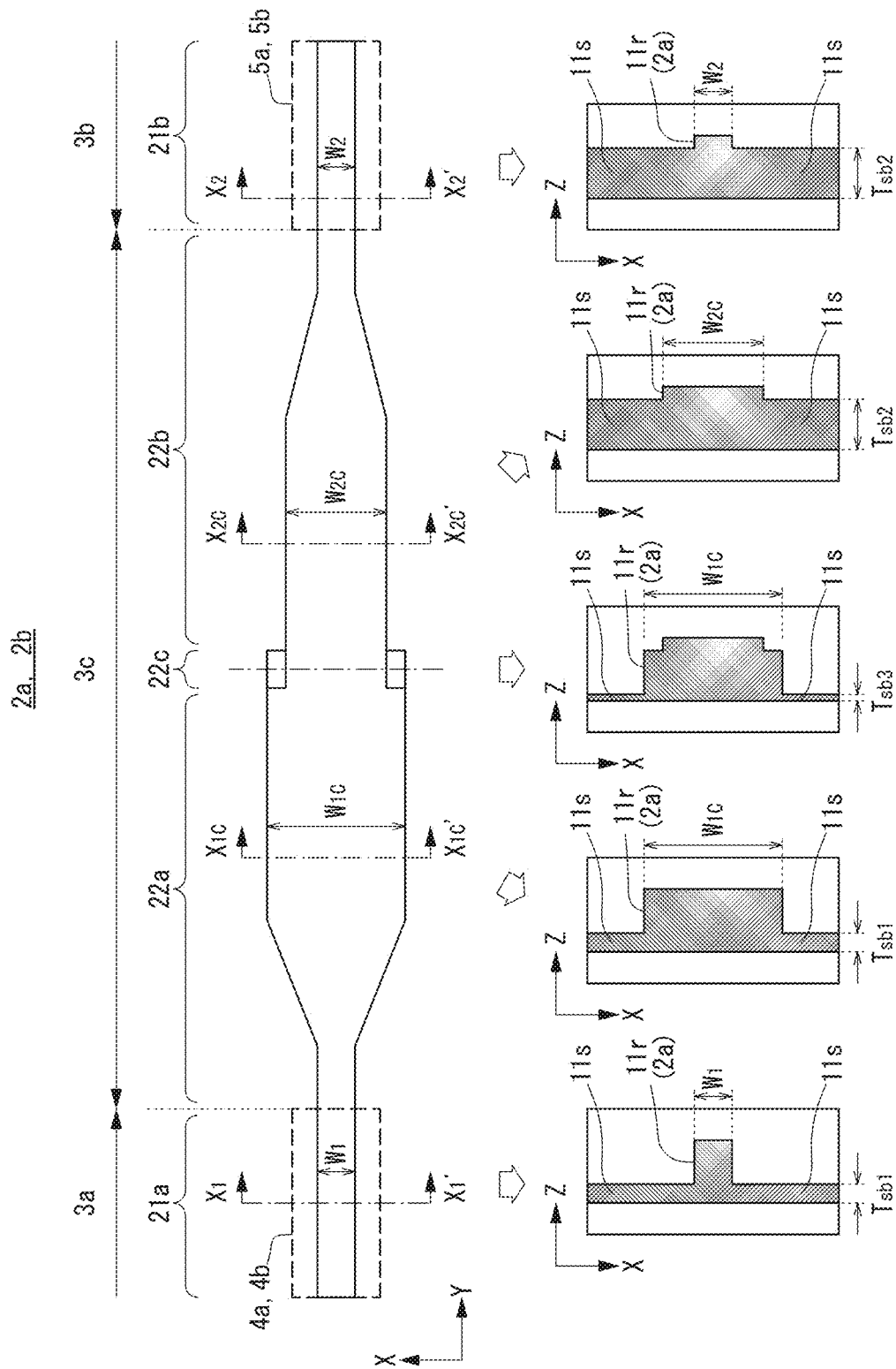
FIG. 6 shows an optical modulation element according to a second embodiment of the present invention, and includes a schematic plan view and schematic cross-sectional views illustrating a waveguide structure around the intermediate part between the RF part and DC part.
Figure 7:
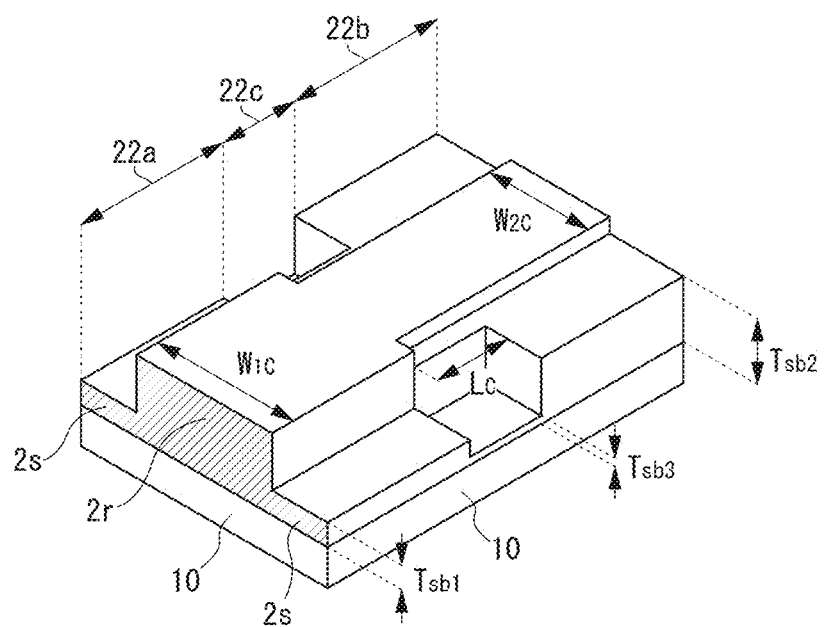
FIG. 7 is a schematic perspective view three-dimensionally illustrating the waveguide structure in the intermediate part illustrated in FIG. 6.

FIG. 6 shows an optical modulation element according to a second embodiment of the present invention, and includes a schematic plan view and schematic cross-sectional views illustrating a waveguide structure around the intermediate part 3c between the RF part 3a and DC part 3b. FIG. 7 is a schematic perspective view three-dimensionally illustrating the waveguide structure in the intermediate part 3c illustrated in FIG. 6.

As illustrated in FIGS. 6 and 7, the optical modulation element 1 according to the present embodiment is featured in that a third intermediate waveguide part 22c is provided between the first and second intermediate waveguide parts 22a and 22b. The third intermediate waveguide part 22c has: a ridge part 11r of a two-tier structure composed of a ridge lower part having the same ridge width ($W_{1c}$) as that of the first intermediate waveguide part 22a and a ridge upper part having the same ridge width ($W_{2c}$) as that of the second intermediate waveguide part 22b; and a slab part 11s formed on both sides of the two-tiered ridge part 11r. A slab film thickness $T_{sb3}$ of the third intermediate waveguide part 22c is smaller than the slab film thickness $T_{sb1}$ of the first intermediate waveguide part 22a. Although the third intermediate waveguide part 22c is a ridge waveguide having such a thin slab part 11s in the present embodiment, the slab part 11s of the third intermediate waveguide part 22c may be completely eliminated.

A length $L_C$ of the third intermediate waveguide part 22c is preferably 3 μm or less. This is because an excessively large length of the third intermediate waveguide part 22c increases propagation loss.

Figure 8A:
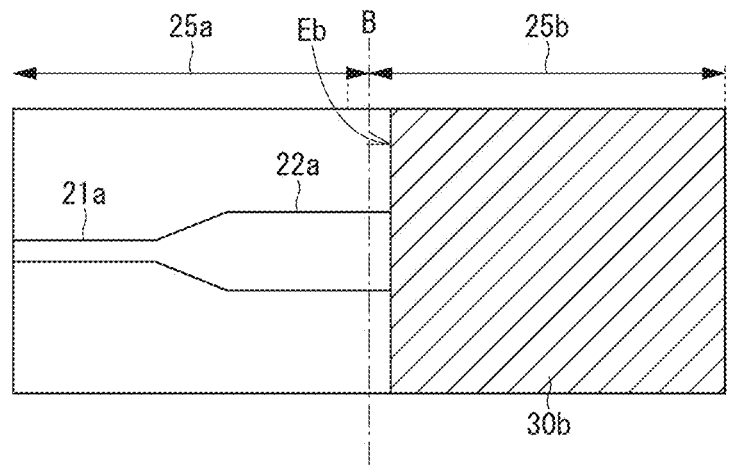
FIGS. 8A to 8C are views for explaining a formation method for a waveguide structure having the third intermediate waveguide part illustrated in FIGS. 6 and 7.
Figure 8B:
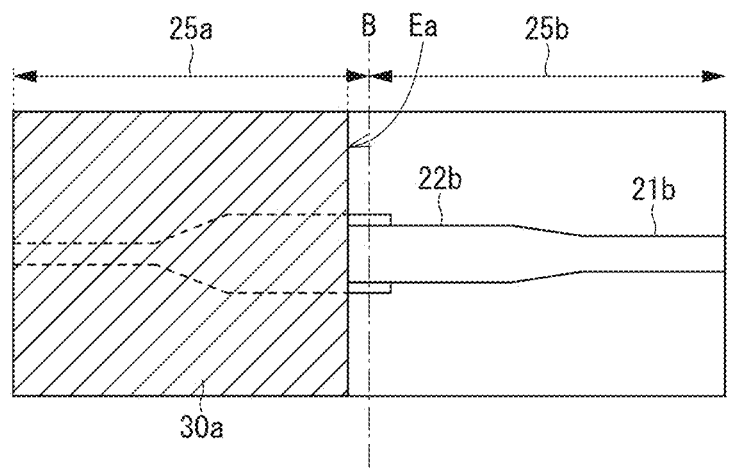
Figure 8C:
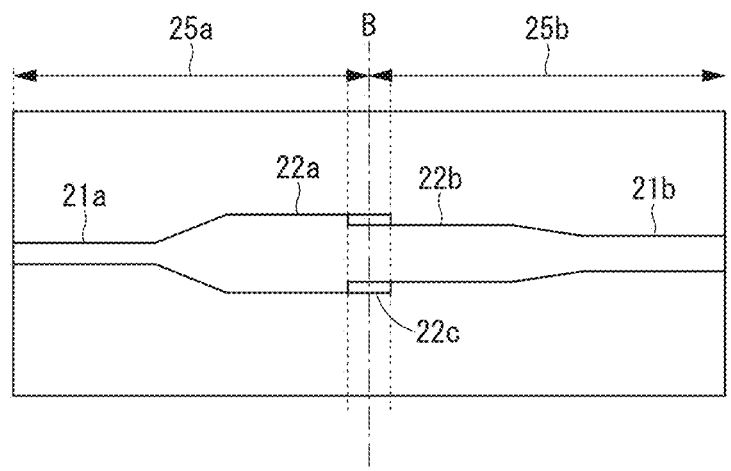

FIGS. 8A to 8C are views for explaining a formation method for a waveguide structure having the third intermediate waveguide part 22c illustrated in FIGS. 6 and 7.

As illustrated in FIGS. 8A to 8C, the waveguide structure having the third intermediate waveguide part 22c can be formed by partially overlapping a processing area for forming the waveguide pattern in the RF part 3a and a processing area for forming the waveguide pattern in the DC part 3b in the vicinity of the boundary therebetween.

Specifically, as illustrated in FIG. 8A, substantially the entire surface of a formation area 25b for the DC part 3b is covered with a mask 30b, and then an electrooptic material film in a formation area 25a for the RF part 3a is processed by milling or the like to form the first waveguide part 21a and first intermediate waveguide part 22a constituting a waveguide pattern in the RF part 3a. At this time, an edge $E_b$ of the mask 30b is located at a position that does not reach a boundary B and does not run off to the formation area 25a for the RF part 3a, so that a part of the formation area 25b for the DC part 3b in the vicinity of the boundary B is subjected to ridge processing. In the processing for the RF part 3a, a thin slab part can be formed by, for example, increasing a processing time.

Then, as illustrated in FIG. 8B, substantially the entire surface of the formation area 25a for the RF part 3a is covered with a mask 30a, and then an electrooptic material film in the formation area 25b for the DC part 3b is processed by milling or the like to form the second waveguide part 21b and second intermediate waveguide part 22b constituting a waveform pattern in the DC part 3b. At this time, an edge $E_a$ of the mask 30a is located at a position that does not reach the boundary B and does not run off to the formation area 25b for the DC part 3b, so that a part of the formation area 25a for the RF part 3a in the vicinity of the boundary B is subjected to ridge processing. In the processing for the DC part 3b, a thick slab part can be formed by, for example, reducing a processing time.

As described above, the ridge processing is doubly applied to the vicinity of the boundary B between the formation area 25a for the RF part 3a and formation area 25b for the DC part 3b, with the result that the third intermediate waveguide part 22c having a different cross-sectional shape from those of the first and second intermediate waveguide parts 22a and 22b is formed as illustrated in FIG. 8C. Although the RF part 3a and DC part 3b are processed in this order in the example illustrated in FIGS. 8A to 8C, the same result can be obtained even when the processing order is reversed.

According to the present embodiment, the same effects as those in the first embodiment can be obtained. That is, the ridge width $W_{1c}$ of the first intermediate waveguide part 22a on the RF part 3a side is made larger than the ridge width $W_{2c}$ of the second intermediate waveguide part 22b on the DC part 3b side, so that it is possible to equalize the spot size of light propagating through the first waveguide part 21a and spot size of light propagating through the second waveguide part 21b to thereby reduce propagation loss.

Figure 9:
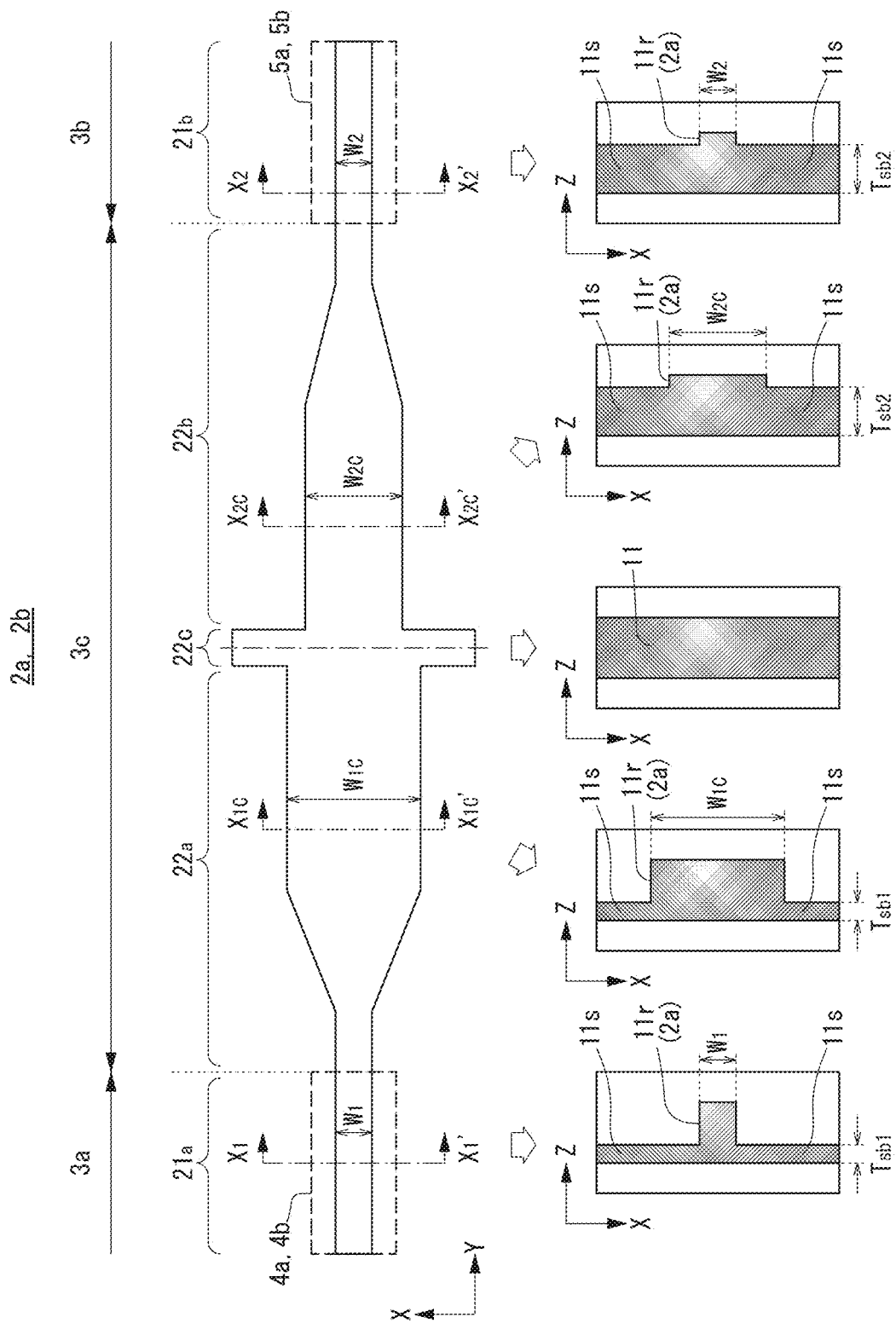
FIG. 9 shows an optical modulation element according to a third embodiment of the present invention, and includes a schematic plan view and schematic cross-sectional views illustrating a waveguide structure around the intermediate part between the RF part and DC part.
Figure 10:
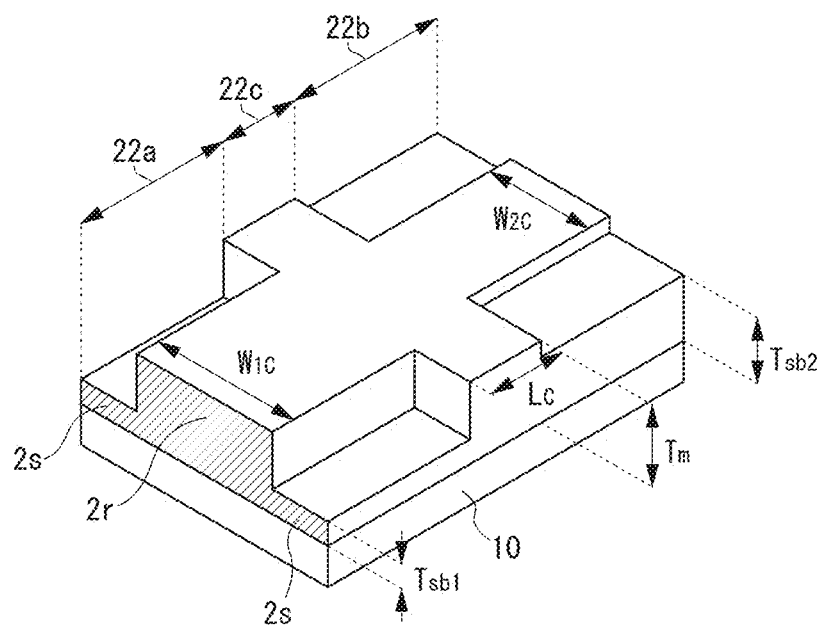
FIG. 10 is a schematic perspective view three-dimensionally illustrating the waveguide structure in the intermediate part 3c illustrated in FIG. 9.

FIG. 9 shows an optical modulation element according to a third embodiment of the present invention, and includes a schematic plan view and schematic cross-sectional views illustrating a waveguide structure around the intermediate part 3c between the RF part 3a and DC part 3b. FIG. 10 is a schematic perspective view three-dimensionally illustrating the waveguide structure in the intermediate part 3c illustrated in FIG. 9.

As illustrated in FIGS. 9 and 10, the optical modulation element 1 according to the present embodiment is featured in that a third intermediate waveguide part 22c is provided between the first and second intermediate waveguide parts 22a and 22b and that the third intermediate waveguide part 22c is composed of an unprocessed waveguide layer 11 having no ridge. That is, the third intermediate waveguide part 22c is an area not having a waveguide shape. Other configurations are the same as those of the second embodiment.

Figure 11A:
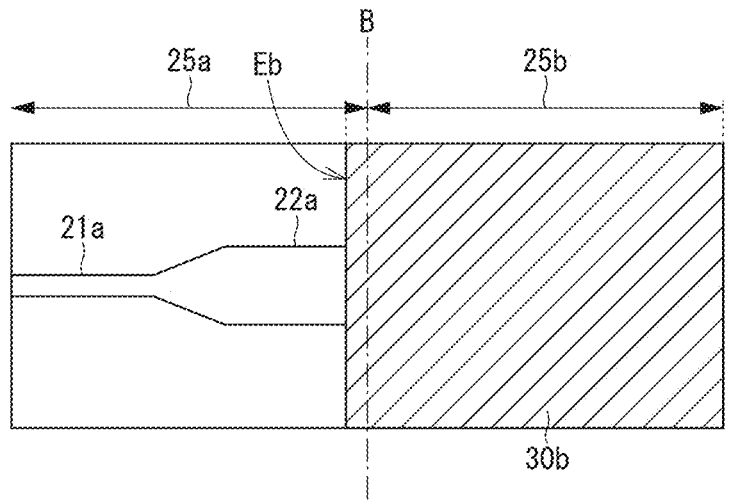
FIGS. 11A to 11C are views for explaining a formation method for a waveguide structure having the third intermediate waveguide part illustrated in FIGS. 9 and 10.
Figure 11B:
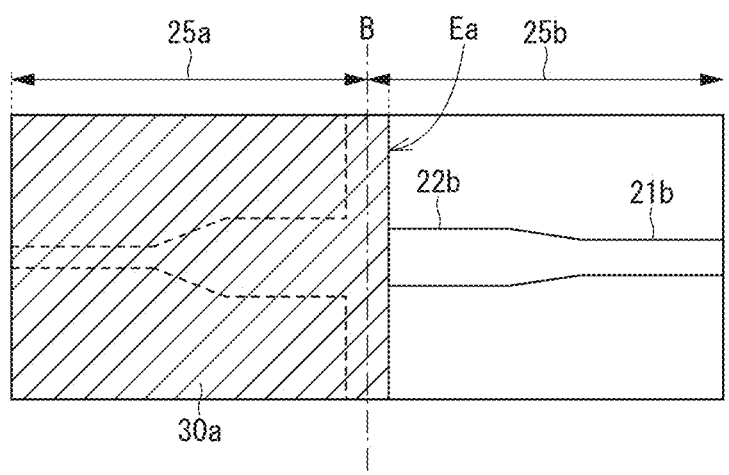
Figure 11C:
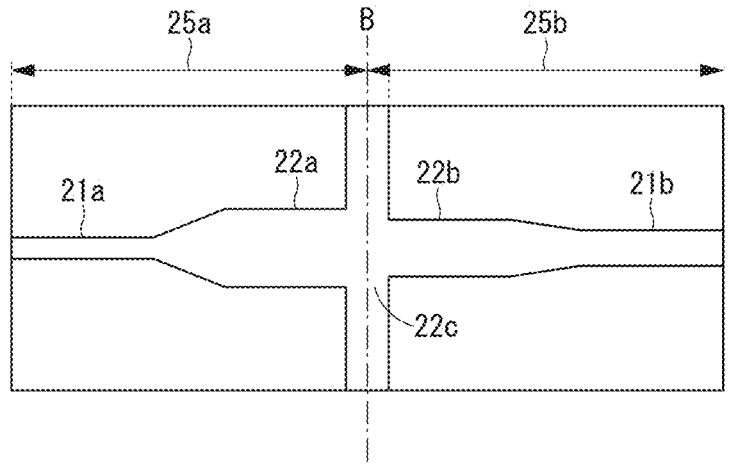

FIGS. 11A to 11C are views for explaining a formation method for a waveguide structure having the third intermediate waveguide part 22c illustrated in FIGS. 9 and 10.

As illustrated in FIGS. 11A to 11C, the waveguide structure having the third intermediate waveguide part 22c can be formed by making a processing area for forming the waveguide pattern in the RF part 3a and a processing area for forming the waveguide pattern in the DC part 3b not overlapping each other in the vicinity of the boundary therebetween.

Specifically, as illustrated in FIG. 11A, substantially the entire surface of a formation area 25b for the DC part 3b is covered with a mask 30b, and then an electrooptic material film in a formation area 25a for the RF part 3a is processed by milling or the like to form the first waveguide part 21a and first intermediate waveguide part 22a constituting a waveguide pattern in the RF part 3a. At this time, an edge $E_b$ of the mask 30b is positioned beyond a boundary B, i.e., runs off to the formation area 25a for the RF part 3a, so that a part of the formation area 25b for the DC part 3b in the vicinity of the boundary B is not subjected to ridge processing. In the processing for the RF part 3a, a thin slab part can be formed by, for example, increasing a processing time.

Then, as illustrated in FIG. 11B, substantially the entire surface of the formation area 25a for the RF part 3a is covered with a mask 30a, and then an electrooptic material film in the formation area 25b for the DC part 3b is processed by milling or the like to form the second waveguide part 21b and second intermediate waveguide part 22b constituting a waveform pattern in the DC part 3b. At this time, an edge $E_a$ of the mask 30a is located beyond the boundary B, i.e., runs off to the formation area 25b for the DC part 3b, so that a part of the formation area 25a for the RF part 3a in the vicinity of the boundary B is not subjected to ridge processing. In the processing for the DC part 3b, a thick slab part can be formed by, for example, reducing a processing time.

As described above, the unprocessed area is formed in the vicinity of the boundary between the formation area 25a for the RF part 3a and formation area 25b for the DC part 3b, with the result that the third intermediate waveguide part 22c having a different cross-sectional shape from those of the first and second intermediate waveguide parts 22a and 22b is formed as illustrated in FIG. 11C.

According to the present embodiment, the same effects as those in the first embodiment can be obtained. That is, the ridge width $W_{1c}$ of the first intermediate waveguide part 22a on the RF part 3a side is made larger than the ridge width $W_{2c}$ of the second intermediate waveguide part 22b on the DC part 3b side, so that it is possible to equalize the spot size of light propagating through the first waveguide part 21a and spot size of light propagating through the second waveguide part 21b to thereby reduce propagation loss.

Figure 12A:
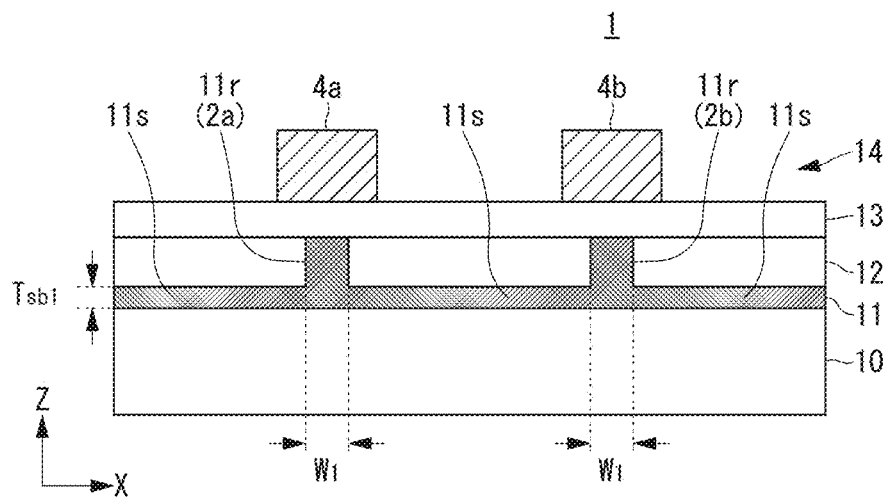
Figure 12B:
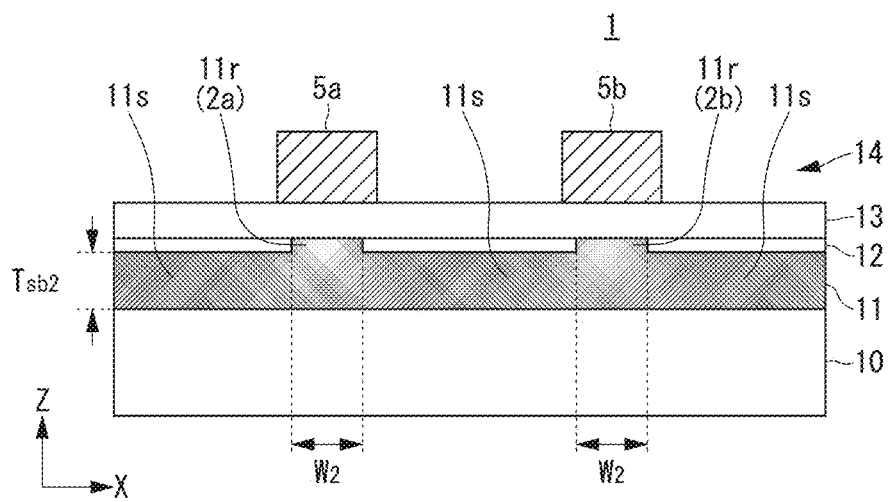
Figure 13:
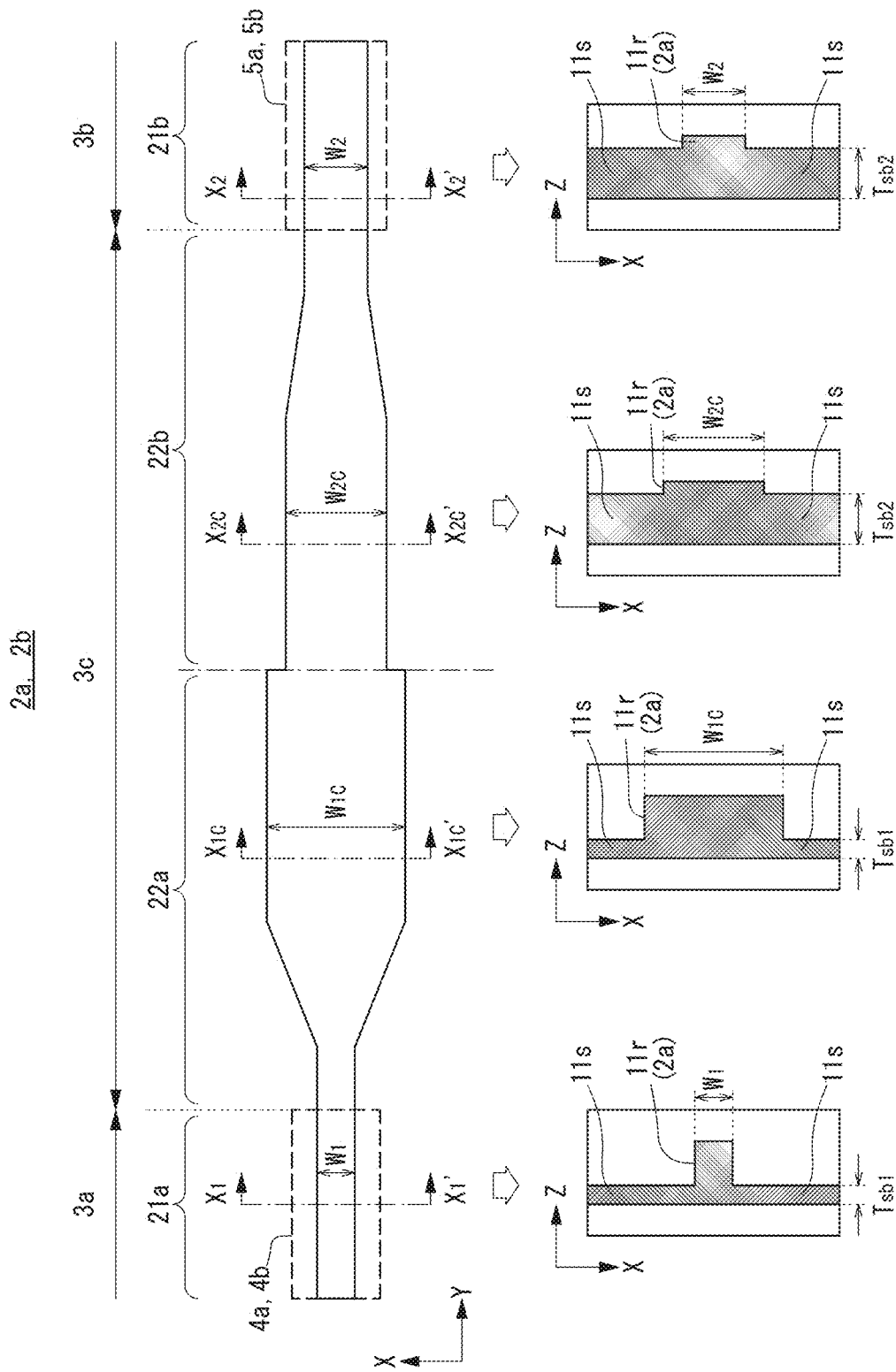
FIG. 13 is a schematic plan view illustrating a waveguide structure around the intermediate part between the RF part and DC part.

FIGS. 12A and 12B are schematic cross-sectional views of an optical modulation element 1 according to a fourth embodiment of the present invention. FIG. 12A is a cross-sectional view of the RF part 3a, and FIG. 12B is a cross-sectional view of the DC part 3b. FIG. 13 is a schematic plan view illustrating a waveguide structure around the intermediate part 3c between the RF part 3a and DC part 3b.

As illustrated in FIGS. 12A, 12B, and 13, the optical modulation element 1 according to the present embodiment is featured in that the width $W_1$ of the first and second waveguides 2a and 2b (first waveguide part 21a) in the RF part 3a and the width $W_2$ of the first and second waveguides 2a and 2b (second waveguide part 21b) in the DC part 3b differ from each other. In the present embodiment, the width $W_2$ of the first and second waveguides 2a and 2b (second waveguide part 21b) in the DC part 3b is larger than the width $W_1$ of the first and second waveguides 2a and 2b (first waveguide part 21a) in the RF part 3a. Other configurations are the same as those of the first embodiment. According to the optical modulation element 1 of the present embodiment, it is possible not only to obtain the same effects as those in the first embodiment but also to enhance the DC drift reduction effect.

Figure 14A:
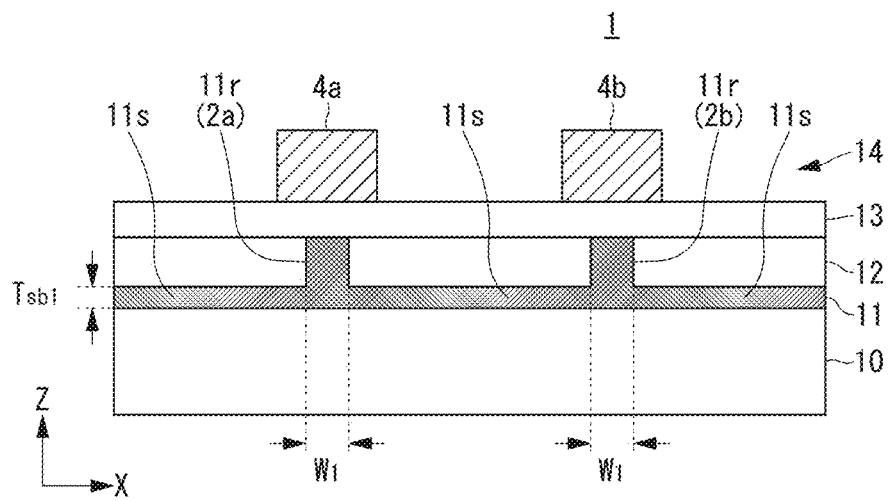
FIGS. 14A and 14B are schematic cross-sectional views of a structure of a DC part of an optical modulation element according to a fifth embodiment of the present invention.
Figure 14B:
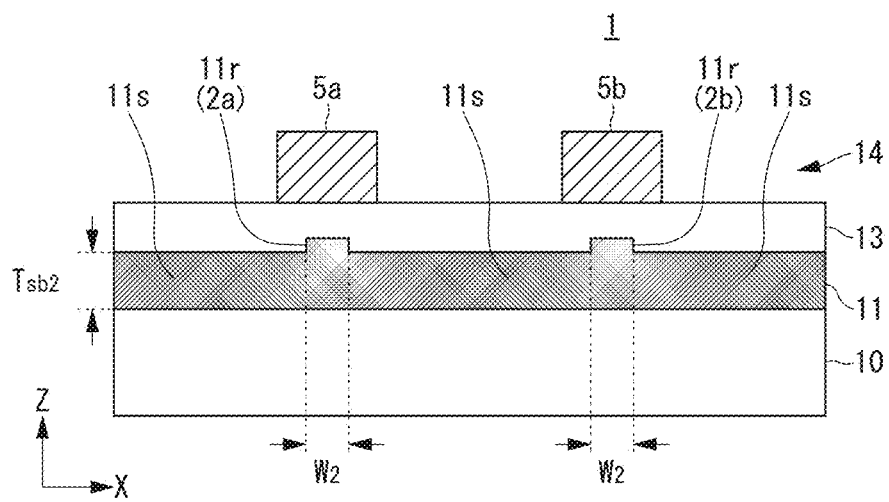

FIGS. 14A and 14B are schematic cross-sectional views of an optical modulation element 1 according to a fifth embodiment of the present invention. FIG. 14A is a cross-sectional view of the RF part 3a, and FIG. 14B is a cross-sectional view of the DC part 3b.

As illustrated in FIGS. 14A and 14B, the optical modulation element 1 according to the present embodiment is featured in that the protective layer 12 is omitted in the DC part 3b. That is, the DC part 3b of the optical modulation element 1 has a multilayer structure including the substrate 10, waveguide layer 11, buffer layer 13, and electrode layer 14, which are laminated in this order. The buffer layer 13 is formed over the entire surface of the waveguide layer 11 so as to cover not only the upper surface of the ridge part 11r but also the side surfaces thereof. Accordingly, the upper surface of the slab part 11s on both sides of the ridge part 11r is also covered with the buffer layer 13.

When the protective layer 12 is omitted in the DC part 3b, the buffer layer 13 in the DC part 3b is preferably made of a dielectric material different from that of the buffer layer 13 in the RF part 3a and is preferably made of the same dielectric material as that of the protective layer 12 in the RF part 3a. That is, the buffer layer 13 in the DC part 3b is preferably formed using the same dielectric material as that of the protective layer 12 in the RF part 3a. The configuration in which the protective layer 12 is omitted in the DC part 3b is equivalent to a configuration in which the protective layer 12 and buffer layer 13 in the DC part 3b illustrated in FIG. 2B are formed using the same material.

While the preferred embodiments of the present invention have been described, the present invention is not limited to the above embodiments, and various modifications may be made within the scope of the present invention, and all such modifications are included in the present invention.

For example, in the above respective embodiments, an optical modulation element of a dual drive type in which a pair of signal electrodes are provided for a Mach-Zehnder optical waveguide having a pair of optical waveguides has been described; however, the present invention is not limited to optical modulation elements having such a configuration but may be applied to various optical modulation elements having the RF part 3a and DC part 3b.

Further, in the above respective embodiments, the optical modulation element has a pair of optical waveguides each formed of the lithium niobate film epitaxial grown on the substrate 10; however, the present invention is not limited to such a structure, but the optical waveguides may be formed of an electrooptic material such as barium titanate or lead zirconium titanate. However, the optical waveguide formed of the lithium niobate film can be reduced in width to achieve a reduction in driving voltage, whereas a problem of DC drift is conspicuous, and thus the effects of the present invention are great. Further, as the waveguide layer 11, a semiconductor material, a polymer material, or the like having electrooptic effect may be used.

Examples (Evaluation of Slab Film Thickness in RF Part 3a)

Figure 15:
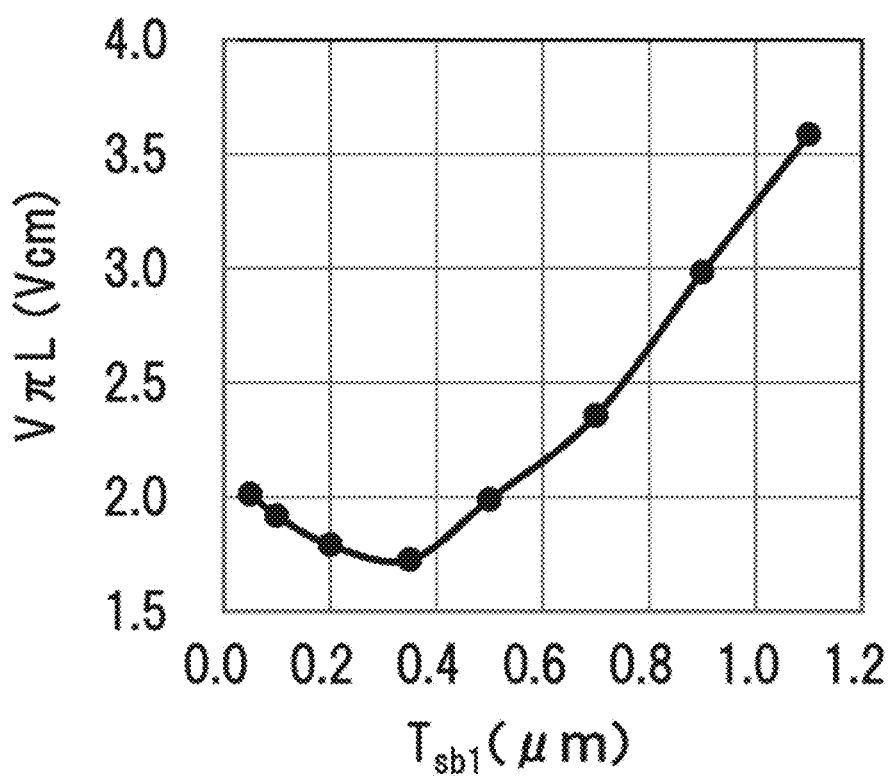
FIG. 15 is a graph showing a relationship between the slab film thickness Tsb1 of the ridge waveguide in the RF portion and the electric field efficiency VπL.

The influence of the slab film thickness $T_{sb1}$ of the ridge waveguide in the RF part 3a on the electric field efficiency VπL was evaluated by simulation. The thickness of the waveguide layer 11 formed of a lithium niobate film was set to 1.5 µm, and the electric field efficiency VπL was calculated while varying the slab film thickness $T_{sb1}$. As a result, as illustrated in FIG. 15, the VπL became minimum when the slab film thickness $T_{sb1}$ of the ridge waveguide was about 0.3 µm. Further, when the slab film thickness $T_{sb1}$ was 0.6 µm, the VπL fell within a preferable range of 2.2 Vcm or less.

(Evaluation of Slab Film Thickness in DC Part)

The influence of the slab film thickness $T_{sb2}$ of the ridge waveguide in the DC part 3b on DC drift was evaluated. In this evaluation test, the amount of DC drift was measured while applying a constant bias voltage to a bias electrode under a temperature of 80° C., and a time (lifetime) required from the start of the evaluation test until the DC drift amount exceeded 50% was measured. The thickness of the waveguide layer 11 formed of a lithium niobate film was set to 1.5 µm. As a result, the lifetime was about one hour when the slab film thickness $T_{sb2}$ is 0.3 µm and about 84 hours when the slab film thickness $T_{sb2}$ is 0.6 µm. On the other hand, when the slab film thickness $T_{sb2}$ was 1.1 µm, the lifetime was as satisfactory as more than 1000 hours.

(Evaluation of Ridge Width of First and Second Intermediate Waveguide Parts)

Figure 16:
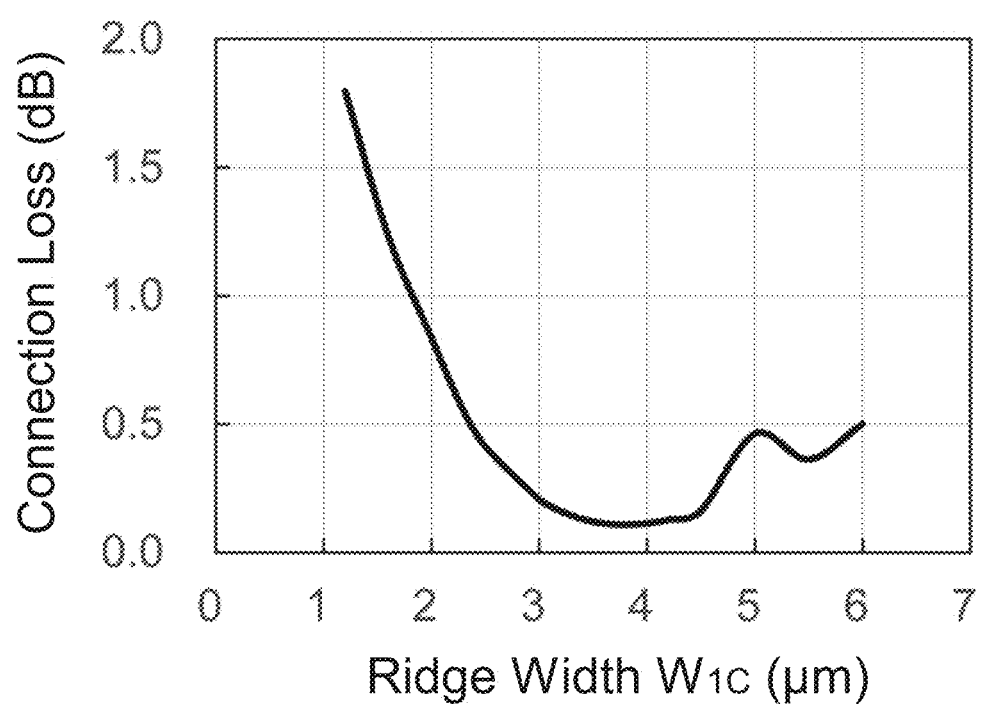
FIG. 16 is a graph showing the relationship between the ridge width WIC of the first intermediate part on the RF part side and the connection loss (dB).

For the waveguide structure illustrated in FIGS. 3 and 4, a variation in connection loss (dB) was evaluated by simulation while varying the ridge width $W_{1c}$ of the first intermediate waveguide part 22a. The thickness of the waveguide layer 11 formed of a lithium niobate film was set to 1.5 µm, the ridge width $W_{2c}$ of the second intermediate waveguide part 22b was set to 2.5 µm, the slab film thickness $T_{sb1}$ of the first intermediate waveguide part 22a was set to 0.4 µm, and the slab film thickness $T_{sb2}$ of the second intermediate waveguide part 22b was set to 1.1 µm. As a result, as illustrated in FIG. 16, connection loss became minimum in the range of the ridge width $W_{1c}$ of 3 µm to 4.5 µm. Thus, a reduction in connection loss of a ridge wave guide having different slab film thicknesses was confirmed.

(Evaluation of Misalignment of Optical Waveguide)

The influence of a magnitude ΔW of axis misalignment of the optical guide illustrated in FIGS. 11A to 11C on connection loss was evaluated by simulation. The thickness of the waveguide layer 11 formed of a lithium niobate film was set to 1.5 µm, and five combinations of the ridge widths ($W_{1c}$, $W_{2c}$) of the first and second intermediate waveguide parts 22a and 22b were set as follows: (1.2 µm, 2.5 µm); (2.5 µm, 2.5 µm); (3.8 µm, 2.5 µm); (4.2 µm, 3 µm); and (5.2 µm, 4 µm). Further, the slab film thickness $T_{sb1}$ of the first intermediate waveguide part 22a was set to 0.4 µm, and the slab film thickness $T_{sb2}$ of the second intermediate waveguide part 22b was set to 1.1 µm.

Figure 17:
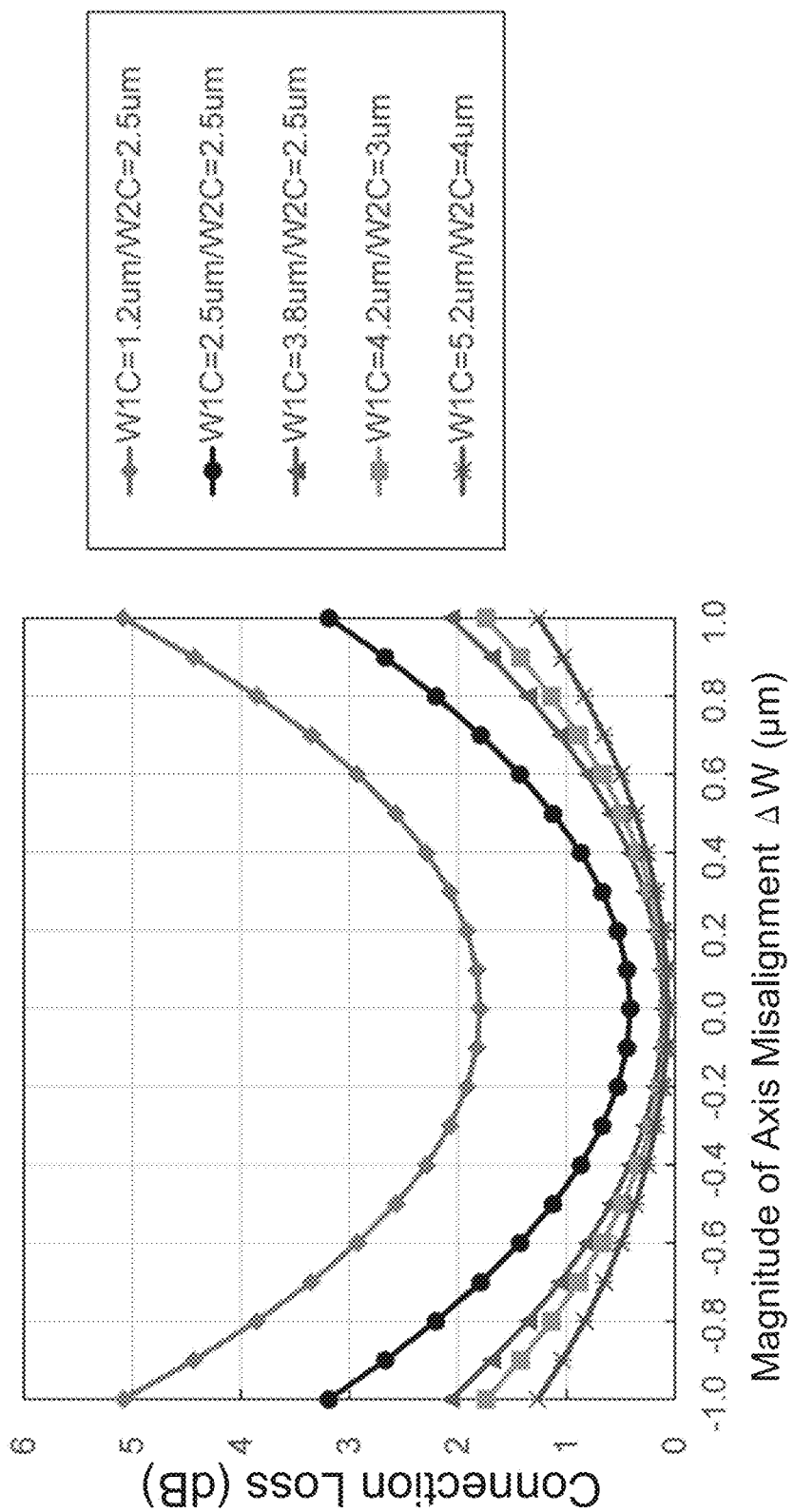
FIG. 17 is a graph showing a relationship between the magnitude ΔW of the axial deviation between the first intermediate waveguide part and the second intermediate waveguide part and the connection loss (dB).

As a result, as illustrated in FIG. 17, in the absence of the axis misalignment, connection loss of the optical waveguide tended to increase as the ridge widths $W_{1c}$ and $W_{2c}$ of the respective first and second intermediate waveguide parts 22a and 22b reduced. In the presence of the axis misalignment, connection loss increased with an increase in the axis misalignment. Specifically, when the ridge widths ($W_{1c}$, $W_{2c}$) of the first and second intermediate waveguide parts 22a and 22b were (1.2 µm, 2.5 µm), the increasing rate of connection loss with respect to the axis misalignment was highest, and when the ridge widths ($W_{1c}$, $W_{2c}$) of the first and second intermediate waveguide parts 22a and 22b were (5.2 µm, 4 µm), the increasing rate of connection loss with respect to the axis misalignment was lowest. In summary, the smaller the ridge widths $W_{1c}$ and $W_{2c}$ the smaller the ridge widths $W_{1c}$ and $W_{2c}$ of the first and second intermediate waveguide parts 22a and 22b, the higher the increasing rate of connection loss.

(Evaluation of Third Intermediate Waveguide Part)

The influence of the presence of the third intermediate waveguide part 22c illustrated in FIGS. 6 to 11 on connection loss (dB) was evaluated by simulation. The thickness of the waveguide layer 11 formed of a lithium niobate film was set to 1.5 µm, the slab film thickness $T_{sb1}$ of the first intermediate waveguide part 22a was set to 0.4 µm, and the slab film thickness $T_{sb2}$ of the second intermediate waveguide part 22b was set to 1.1 µm. Further, three combinations of the ridge widths ($W_{1c}$, $W_{2c}$) of the first and second intermediate waveguide parts 22a and 22b were set as follows: (3.8 µm, 2.5 µm); (4.2 µm, 3 µm); and (5.2 µm, 4 µm). For each of the above three combinations, a case (FIGS. 6 to 8) where the slab film thickness was small (in this simulation, slab film thickness was set to 0) and a case (FIGS. 9 to 11) where the waveguide structure is absent were evaluated in combination.

Figure 18:
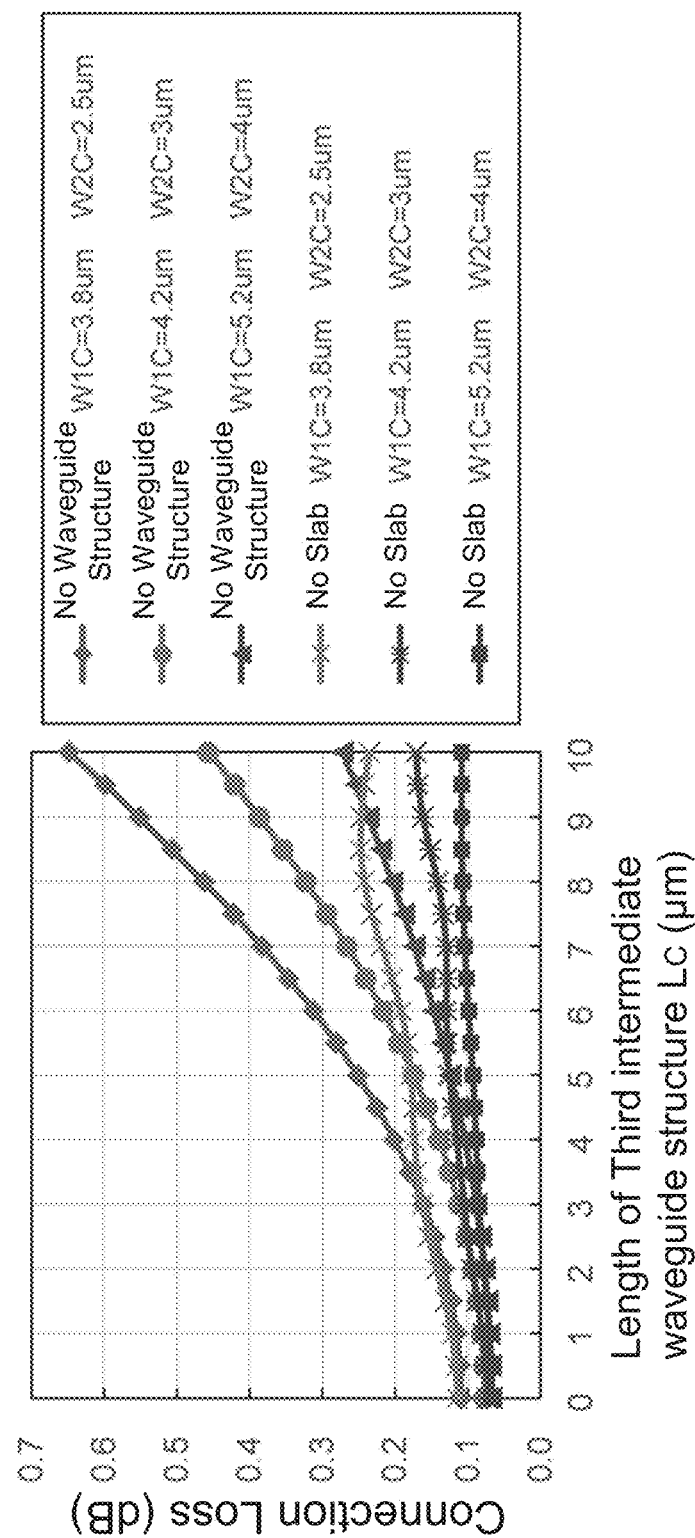
FIG. 18 is a graph showing a relationship between the length LC of the third intermediate waveguide part and the connection loss (dB).

As a result, as illustrated in FIG. 18, connection loss increased as the length of the third intermediate waveguide part 22c increased. In particular, the increasing rate of connection loss was higher for the third intermediate waveguide part 22c illustrated in FIGS. 9 to 11 having no waveguide structure than for the third intermediate waveguide part 22c illustrated in FIGS. 6 to 8 having no slab part. However, in either structure, connection loss was 0.2 dB or less when the length of the third intermediate waveguide part 22c was 3 µm or less. It is fully possible to manufacture the third intermediate waveguide part 22c having a length of 3 µm or less, and the third intermediate waveguide part 22c having such a length does not cause any practical problems.

REFERENCE SIGNS LIST

1: Optical modulation element
2: Mach-Zehnder optical waveguide
2a: First waveguide
2b: Second waveguide
2c: Demultiplexer
2d: Multiplexer
2i: Input waveguide
2o: Output waveguide
3a: RF part
3b: DC part
3c: Intermediate part
3id: DC interaction part
3ir: RF interaction part
4a: First signal electrode
$4a_1$: One end of first signal electrode
$4a_2$: The other end of first signal electrode
4b: Second signal electrode
$4b_1$: One end of first second signal electrode
$4b_2$: The other end of first second signal electrode
5a: First bias electrode
$5a_1$: One end of first bias electrode
5b: Second bias electrode
$5b_1$: One end of second bias electrode
9: Terminal resistor
9a: Driver circuit
9c: Bias circuit
10: Substrate
11: Waveguide layer
11r: Ridge part
11s: Slab part
12: Protective layer
13: Buffer layer
14: Electrode layer
21a: First waveguide part
21b: Second waveguide part
22a: First intermediate waveguide part
22b: Second intermediate waveguide part
22c: Third intermediate waveguide part
30a: Mask
30b: Mask

What is claimed is:

1. An optical waveguide element comprising:
a substrate; and
an optical waveguide formed of a thin film on the substrate and having a ridge part which is a protruding portion and a slab part having a smaller film thickness than the ridge part, wherein
the optical waveguide includes:
a first waveguide part having a first ridge width and a first slab film thickness;
a second waveguide part having a second ridge width and a second slab film thickness;
a first intermediate waveguide part connected to the first waveguide part and having a third ridge width and the first slab film thickness; and
a second intermediate waveguide part connected to the second waveguide part and having a fourth ridge width and the second slab film thickness,
the first waveguide part, first intermediate waveguide part, second intermediate waveguide part, and second waveguide part are arranged in this order,
the second slab film thickness is larger than the first slab film thickness, and
the third ridge width is larger than the fourth ridge width.

2. The optical waveguide element according to claim 1, wherein
the third ridge width is smaller than twice the fourth ridge width.

3. The optical waveguide element according to claim 1, wherein
the third ridge width is larger than the first ridge width, and
the fourth ridge width is larger than the second ridge width.

4. The optical waveguide element according to claim 1, wherein
the second ridge width is larger than the first ridge width.

5. The optical waveguide element according to claim 1, wherein
the optical waveguide further includes a third intermediate waveguide part provided between the first and second intermediate waveguide parts and having a cross-sectional shape different from those of the first and second intermediate waveguide parts.

6. The optical waveguide element according to claim 5, wherein
the third intermediate waveguide part has a third slab film thickness smaller than the first slab film thickness.

7. The optical waveguide element according to claim 5, wherein
the third intermediate waveguide part has no slab part.

8. The optical waveguide element according to claim 5, wherein
the third intermediate waveguide part has no waveguide shape.

9. The optical waveguide element according to claim 5, wherein
a length of the third intermediate waveguide part is 3 μm or less.

10. The optical waveguide element according to claim 1, wherein
the first slab film thickness is less than 0.6 μm, and the second slab film thickness is 0.6 μm or more.

11. The optical waveguide element according to claim 1, wherein
the thin film is a lithium niobate film, and
the c-axis of the lithium niobate film is oriented perpendicular to the main surface of the substrate.

12. An optical modulation element comprising:
an optical waveguide element according to claim 1;
a signal electrode that applies an RF signal to the first waveguide part; and
a bias electrode that applies a DC bias to the second waveguide part, wherein
the thin film is made of an electrooptic material.

* * * * *